US012716217B2

(12) United States Patent
Qiu

(10) Patent No.: US 12,716,217 B2
(45) Date of Patent: Aug. 25, 2026

(54) FLUID CHANNEL STRUCTURE AND TAP

(71) Applicant: Chunhe Qiu, Wenzhou (CN)

(72) Inventor: Chunhe Qiu, Wenzhou (CN)

( * ) Notice: Subject to any disclaimer, the term of this patent is extended or adjusted under 35 U.S.C. 154(b) by 0 days.

(21) Appl. No.: 19/310,968

(22) Filed: Aug. 27, 2025

(65) Prior Publication Data

US 2025/0376833 A1 Dec. 11, 2025

Related U.S. Application Data

(63) Continuation of application No. 18/174,678, filed on Feb. 27, 2023, now Pat. No. 12,473,719, which is a continuation-in-part of application No. 17/585,472, filed on Jan. 26, 2022, now Pat. No. 11,614,174, which is a continuation-in-part of application No. 17/567,178, filed on Jan. 3, 2022, now abandoned, which is a continuation-in-part of application No. 17/225,114, filed on Apr. 8, 2021, now Pat. No. 11,215,289.

(51) Int. Cl.
*E03C 1/04* (2006.01)
*F16K 27/04* (2006.01)
*E03C 1/02* (2006.01)
*F16K 11/078* (2006.01)

(52) U.S. Cl.
CPC .............. *E03C 1/0403* (2013.01); *E03C 1/04* (2013.01); *F16K 27/045* (2013.01); *E03C 2001/026* (2013.01); *F16K 11/0787* (2013.01)

(58) Field of Classification Search
CPC .... E03C 1/0403; E03C 1/04; E03C 2001/026; F16K 27/045; F16K 11/0787
See application file for complete search history.

(56) References Cited

U.S. PATENT DOCUMENTS 6,371,163 B1 * 4/2002 Kahle .................. F16K 27/045 137/625.4
6,757,921 B2 * 7/2004 Esche ...................... E03C 1/04 4/677
7,533,683 B2 * 5/2009 Ortega ................. F16K 19/006 137/454.6
8,453,669 B2 * 6/2013 Veros ...................... F16K 11/06 4/677
8,944,093 B2 * 2/2015 Veros .................... E03C 1/0403 4/677
10,234,049 B1 * 3/2019 He ........................ F16K 31/605
10,450,729 B2 * 10/2019 Chang .................. F16K 11/085
11,274,761 B2 * 3/2022 Erickson ............... F16K 27/045
11,505,927 B2 * 11/2022 Lu .......................... F16K 31/60

* cited by examiner

*Primary Examiner* — Michael R Reid
*Assistant Examiner* — Christopher D Ballman

(57) ABSTRACT

A tap has a protective housing. The protective housing includes a housing and a connecting column connected thereto. The connecting column defines a first receiving cavity, the housing defines a second receiving cavity, and a positioning part is arranged at an end of the connecting column. The positioning part defines a via hole through which the first receiving cavity is communicated to the second receiving cavity. The fluid channel structure includes: a base, received in the first receiving cavity and mounted on the positioning part. The base defines at least three through holes for water flow. An end of a first extension pipe, an end of a second extension pipe, and an end of a third extension pipe are respectively directly welded to the at least three through holes.

20 Claims, 29 Drawing Sheets

FLUID CHANNEL STRUCTURE AND TAP

CROSS-REFERENCE TO RELATED APPLICATIONS

This application is a continuation application of the U.S. application Ser. No. 18/174,678, filed on Feb. 27, 2023. The U.S. application Ser. No. 18/174,678 is a continuation-in-part of U.S. application Ser. No. 17/585,472, filed on Jan. 26, 2022, now U.S. Pat. No. 11,614,174. The U.S. application Ser. No. 17/585,472 is a continuation-in-part of U.S. application Ser. No. 17/567,178, filed on Jan. 3, 2022; and U.S. application Ser. No. 17/567,178 is a continuation-in-part of U.S. application Ser. No. 17/225,114, filed on Apr. 8, 2021, now U.S. Pat. No. 11,215,289. The contents of the above-identified application are incorporated herein by reference.

FIELD

The present disclosure relates to taps, and, more particularly, to a fluid channel structure, and a tap having the fluid channel structure.

BACKGROUND

The tap normally includes a base which can be connected with the hot water supply, the cold water supply and the outlet pipe to supply hot water, cold water or mixed water. Trouble is, user should insert the hot water supply, the cold water supply and the outlet pipe into the tap and then connect them with the base. Moreover, when user needs to separate the hot water supply, the cold water supply and the outlet pipe from the base, user can only disassemble them in the tap. Thus, there is need of such tap which may be easy to assemble and disassemble.

SUMMARY

The present disclosure provides a fluid channel structure, applied to a tap including a protective housing. The protective housing includes a housing and a connecting column connected to the housing; the connecting column defines a first receiving cavity, the housing defines a second receiving cavity, and a positioning part is arranged at an end of the connecting column and is located inside the second receiving cavity; the positioning part defines a via hole, the first receiving cavity and the second receiving cavity are communicated with each other via the via hole, the first receiving cavity is extending along a first direction, the second receiving cavity is extending along a second direction intersected with the first direction. The fluid channel structure includes: a base, received in the first receiving cavity and mounted on the positioning part; wherein the base defines at least three through holes for water flow; and a first extension pipe, a second extension pipe, and a third extension pipe. The first extension pipe, the second extension pipe, and the third extension pipe are extending in the second receiving cavity; an end of the first extension pipe, an end of the second extension pipe, and an end of the third extension pipe are respectively directly welded to the at least three through holes.

The present disclosure provides a tap, including a valve core assembly. The valve core assembly includes the fluid channel structure as described in the above and a valve structure, connected with the fluid channel structure and configured to open and close the fluid channel structure. One of the base and the positioning part defines at least one notch, the base passes through the via hole and enters into the first receiving cavity by the notch; the base is arranged with a step portion, and the step portion is supported by the positioning part and is received in the first receiving cavity defined inside the positioning part.

The present disclosure provides a tap, including a protective housing, a valve structure and a fluid channel structure. The protective housing includes a housing and a connecting column connected to the housing. The connecting column defines a receiving cavity and is arranged with a positioning part at an end of the connecting column, the positioning part defines a via hole communicated with the receiving cavity, wherein the positioning part mounts the fluid channel structure and the valve structure in the receiving cavity. The fluid channel structure includes: a base, defining at least three first openings and at least three second openings, each of the at least three first openings is communicated to one corresponding second opening to form a first inlet channel, a second inlet channel and an outlet channel; and a connecting member, defining at least three through holes, the at least three through holes are in one-to-one correspondence with the at least three first openings and communicated to corresponding second openings; and a first extension pipe, a second extension pipe, and a third extension pipe. The first extension pipe, the second extension pipe, and the third extension pipe are extending inside the housing; an end of the first extension pipe, an end of the second extension pipe, and an end of the third extension pipe are respectively directly welded to the at least three second openings.

BRIEF DESCRIPTION OF THE DRAWINGS

The advantages and features of the present disclosure will become better understood with reference to the following detailed description taken in conjunction with the accompanying drawing, in which.

Like reference numerals referring to like parts throughout the description of several views of the drawing.

DETAILED DESCRIPTION

Figure 1:
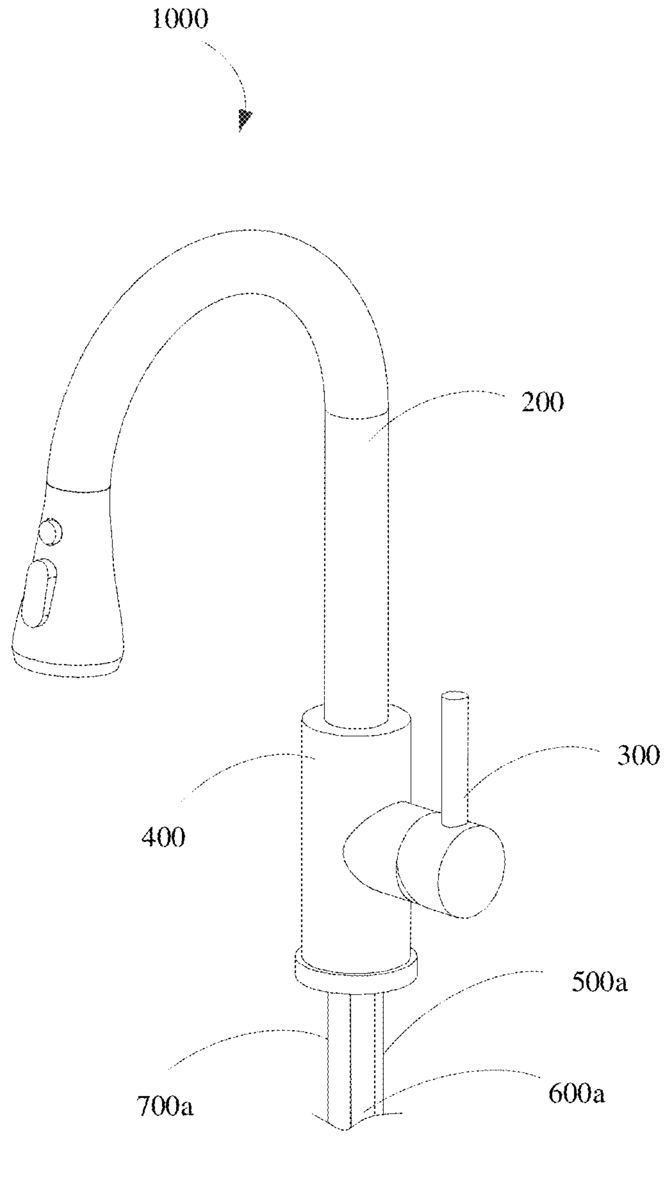
FIG. 1 is a structural diagram of a tap according to an embodiment of the present disclosure.
Figure 2:
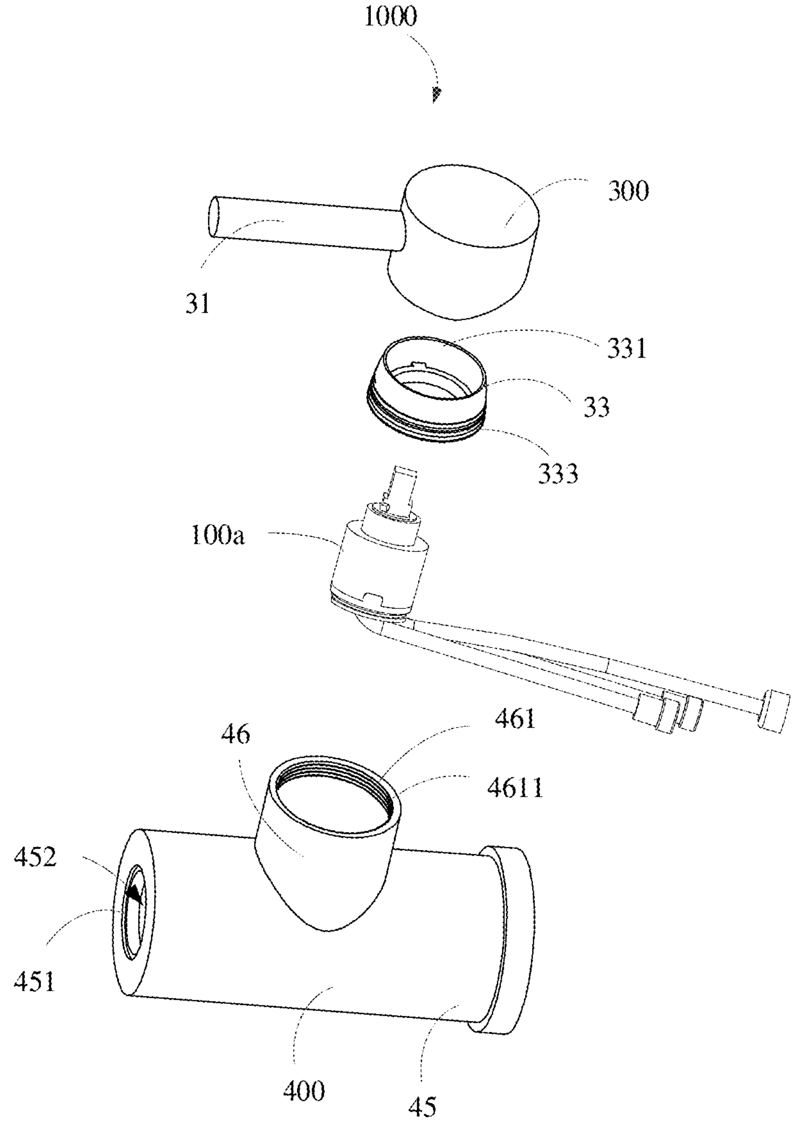
FIG. 2 is an exploded view of a part of the tap shown in FIG. 1.
Figure 3:
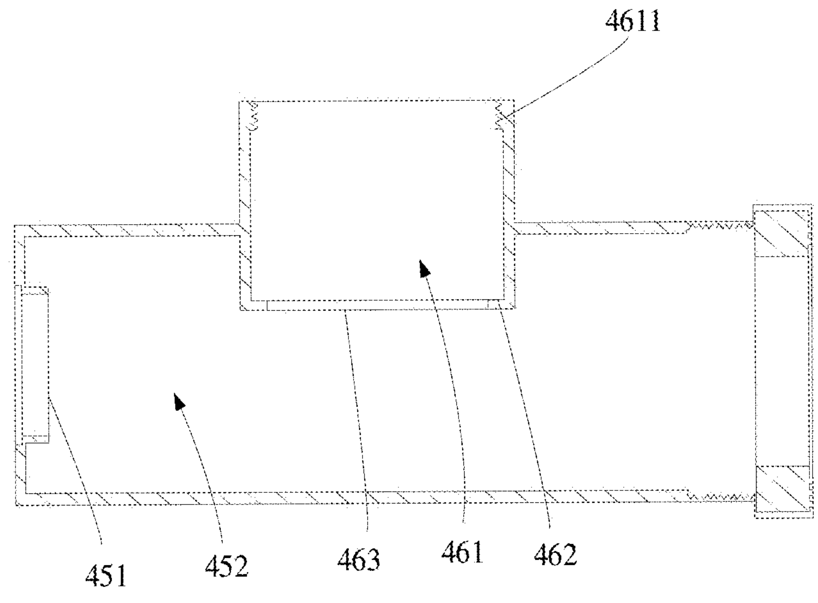
FIG. 3 is a cross sectional view of a protective housing of the tap shown in FIG. 1.
Figure 4:
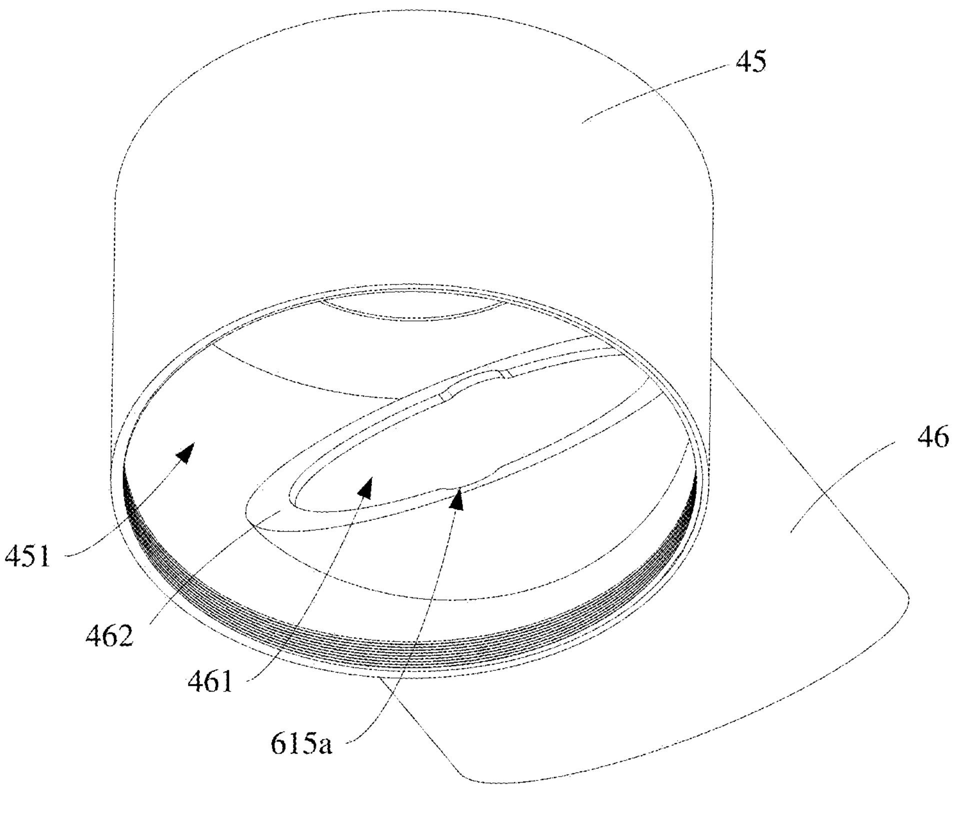
FIG. 4 is a structural diagram of the protective housing of the tap shown in FIG. 1.
Figure 5:
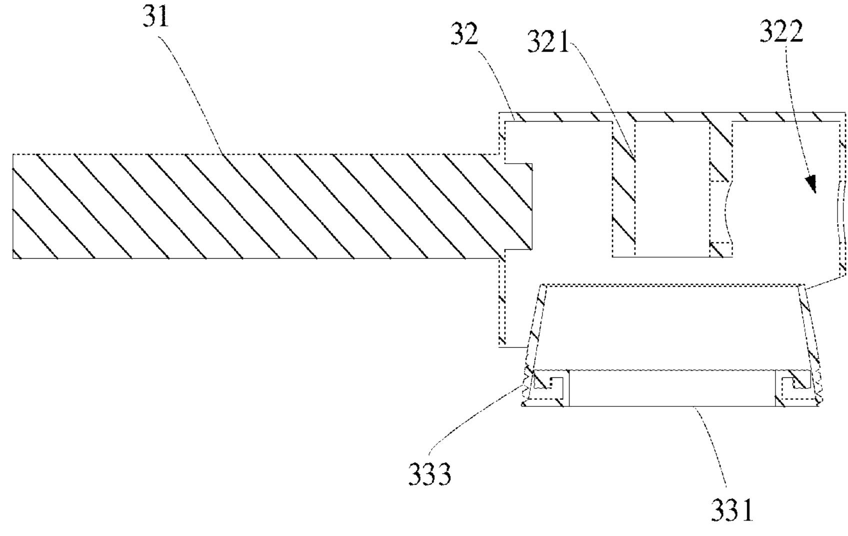
FIG. 5 is a cross sectional view of a handle assembly of the tap shown in FIG. 1.
Figure 6:
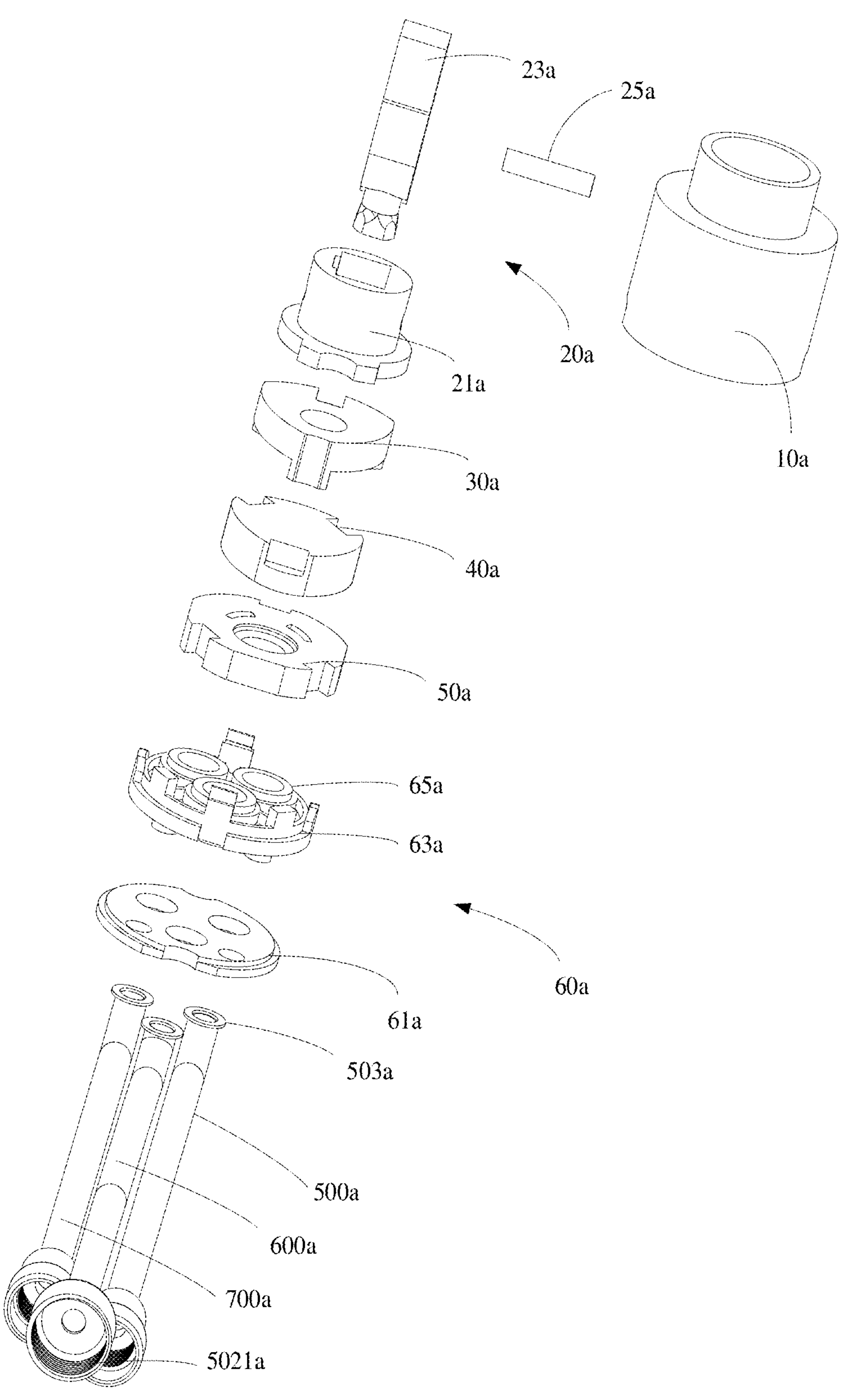
FIG. 6 is an exploded view of a valve core assembly of the tap shown in FIG. 1.
Figure 7:
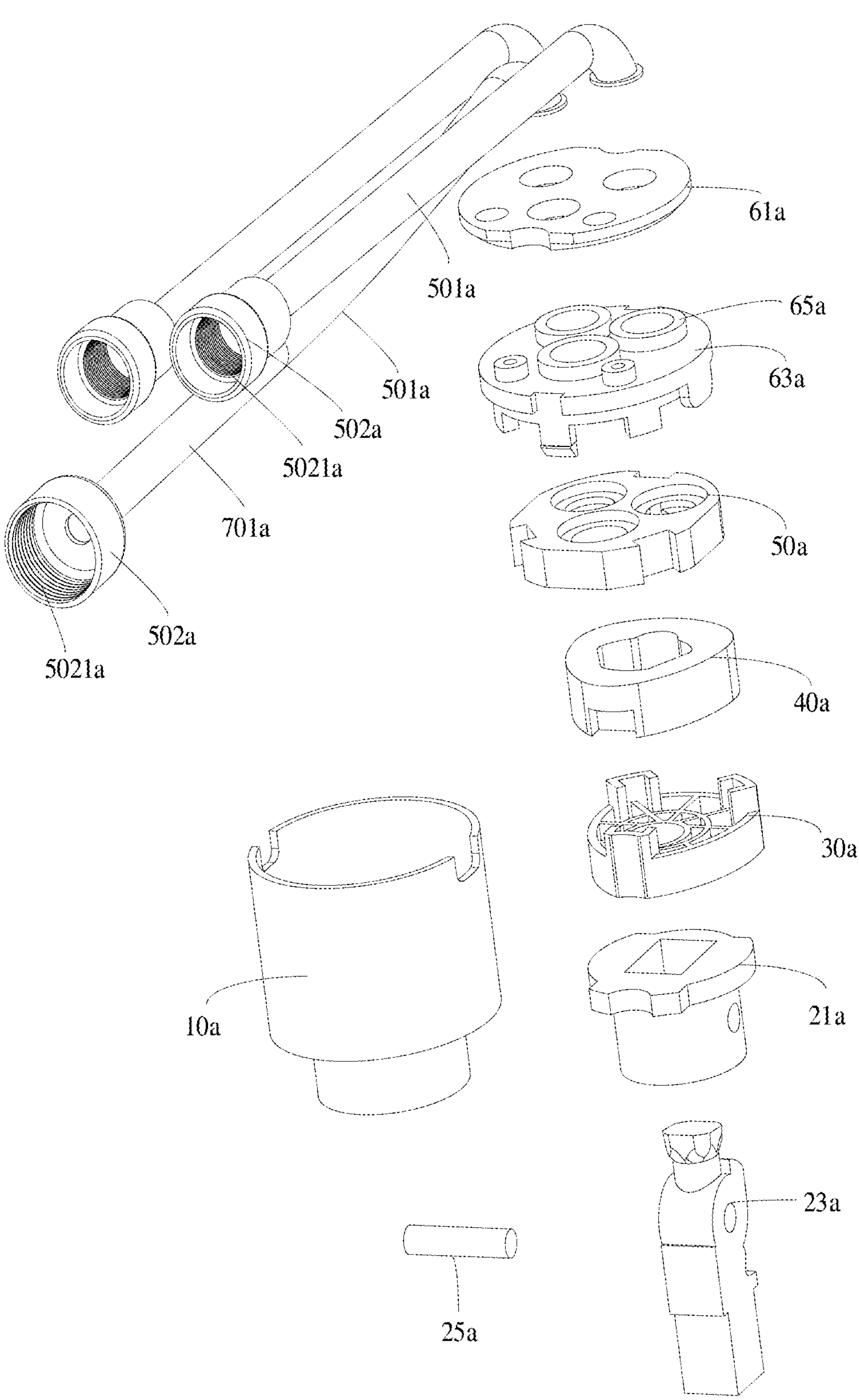
FIG. 7 is another exploded view of the valve core assembly of the tap shown in FIG. 1.
Figure 8:
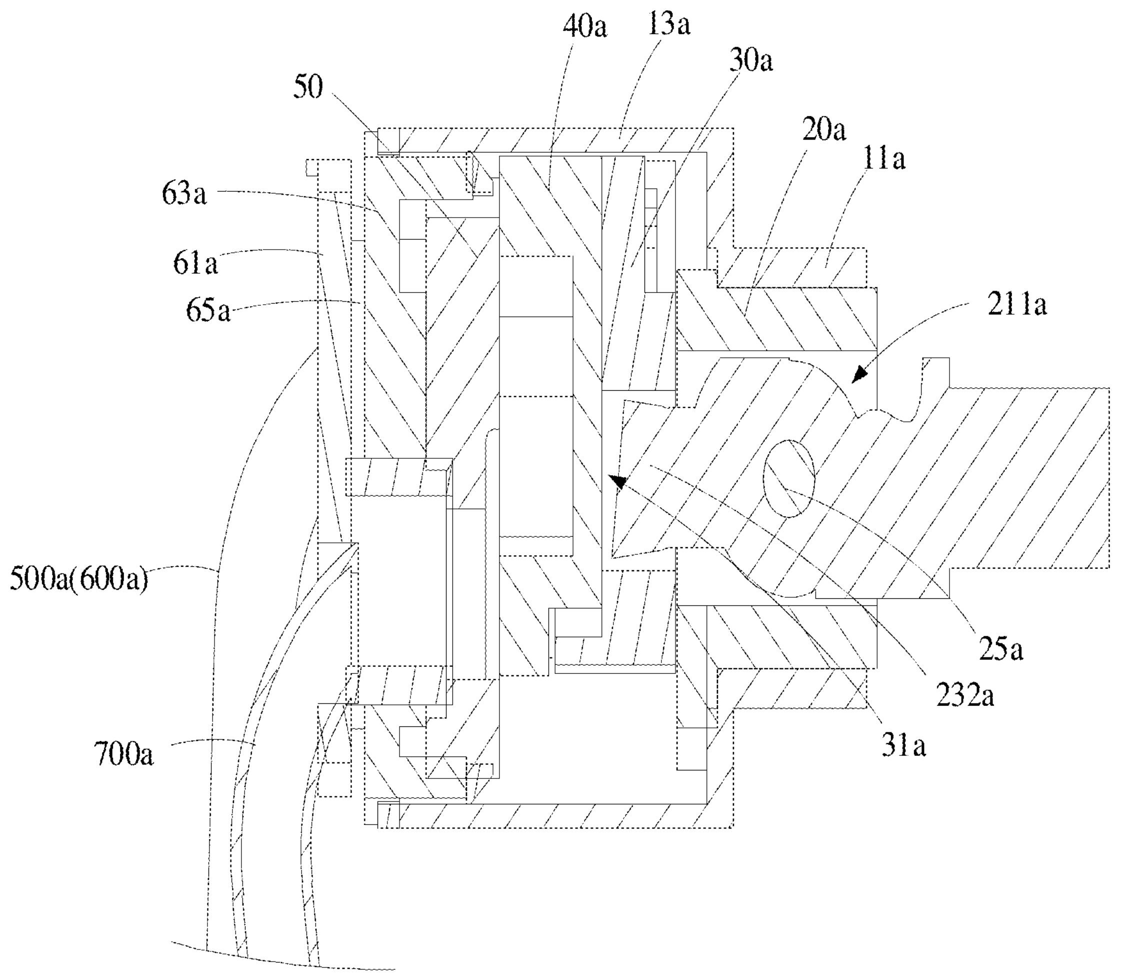
FIG. 8 is a cross sectional view of the valve core assembly of the tap shown in FIG. 1.
Figure 9:
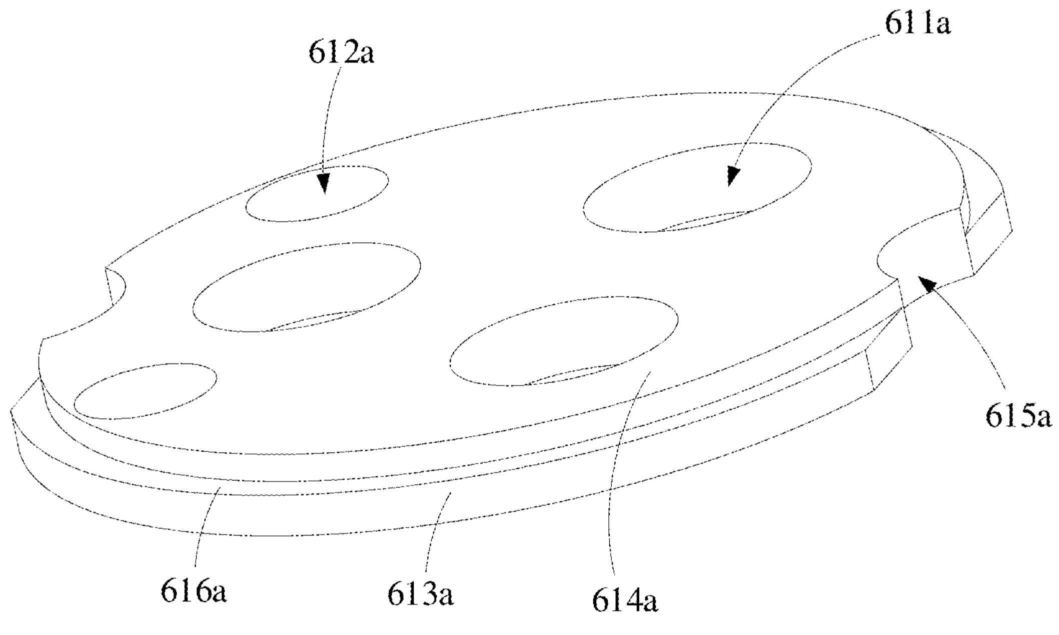
FIG. 9 is a structural diagram of a base of the valve core assembly shown in FIG. 6.
Figure 10:
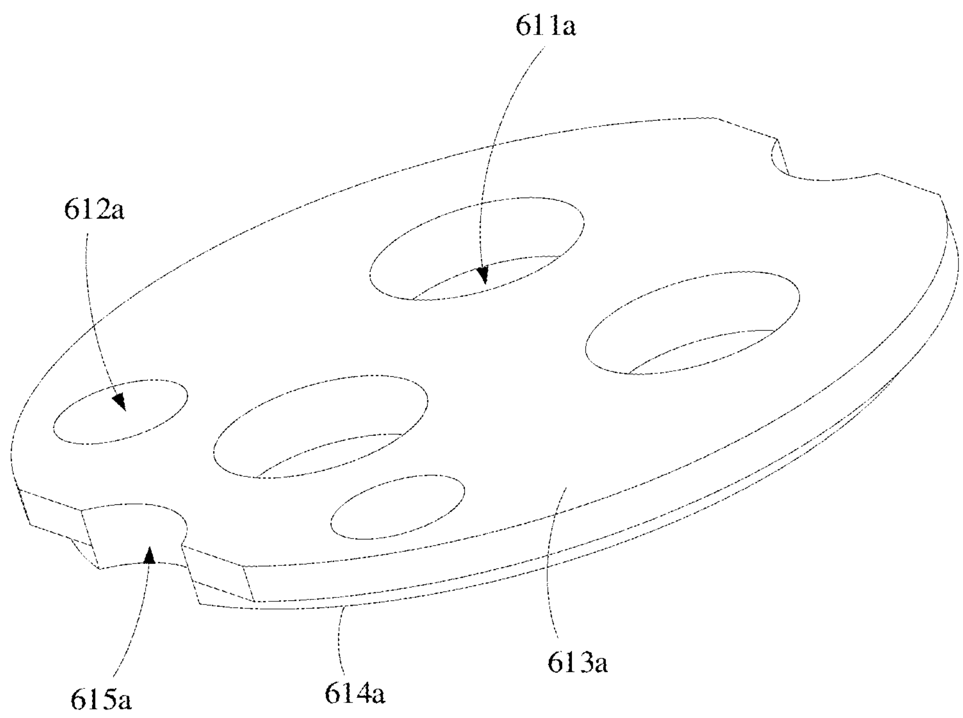
FIG. 10 is another structural diagram of the base of the valve core assembly shown in FIG. 6.
Figure 11:
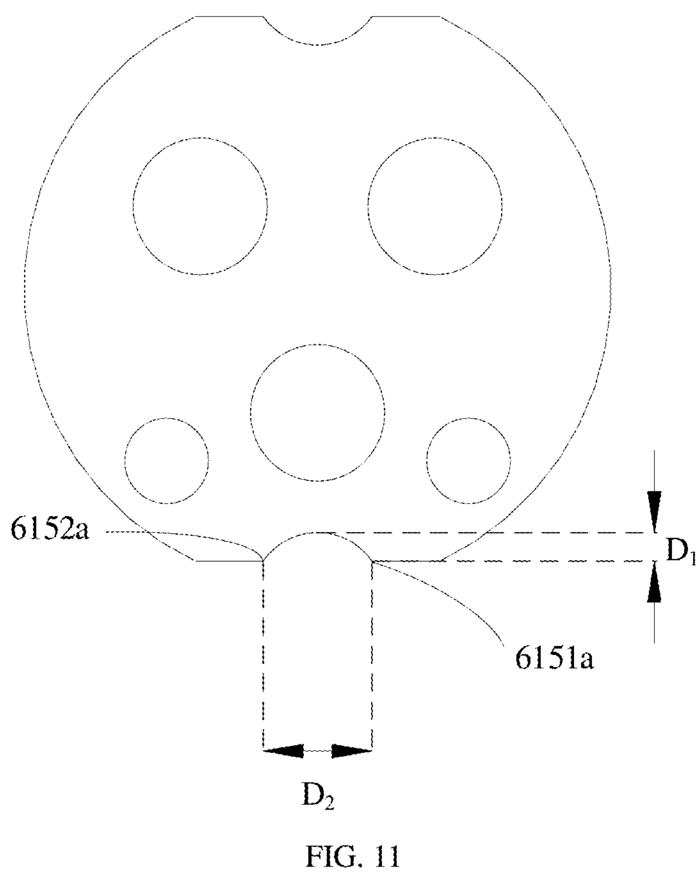
FIG. 11 is a further structural diagram of the base of the valve core assembly shown in FIG. 6.
Figure 12:
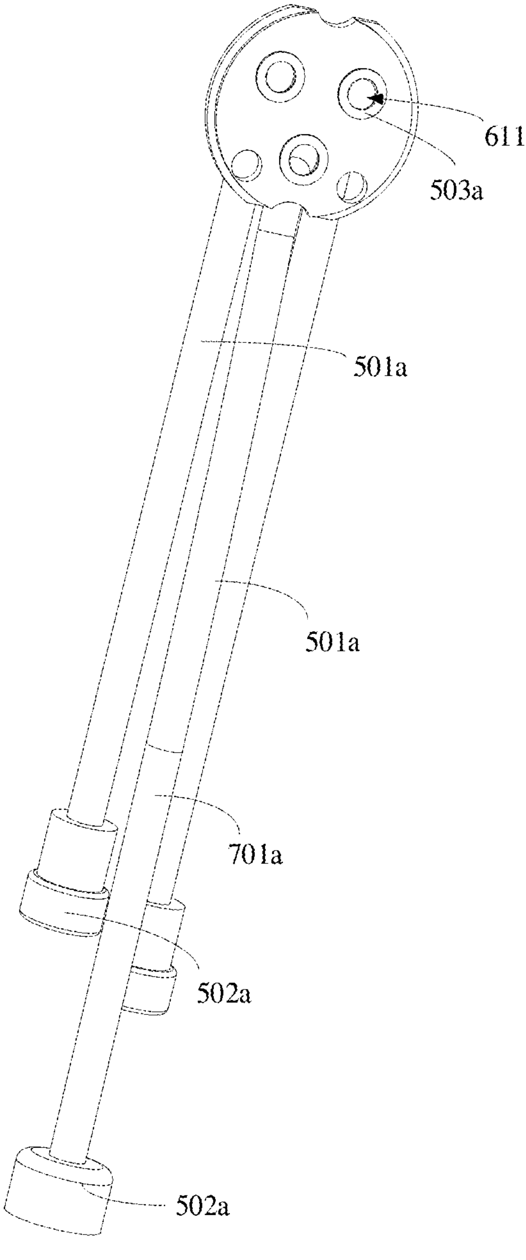
FIG. 12 is a structural diagram of a part of the valve core assembly shown in FIG. 6.
Figure 13:
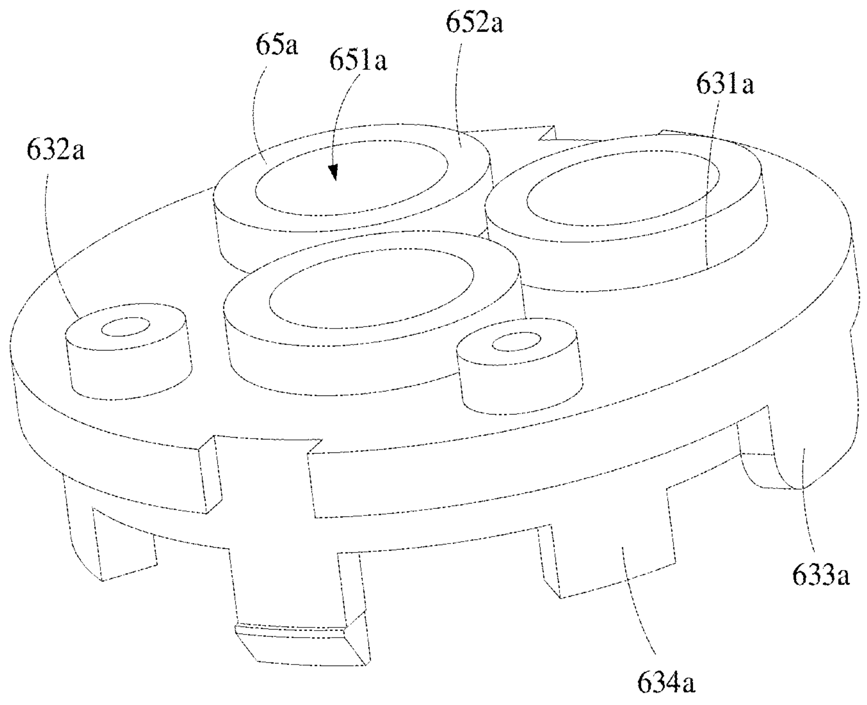
FIG. 13 is a structural diagram of a connecting member and a sealing member of the valve core assembly shown in FIG. 6.
Figure 14:
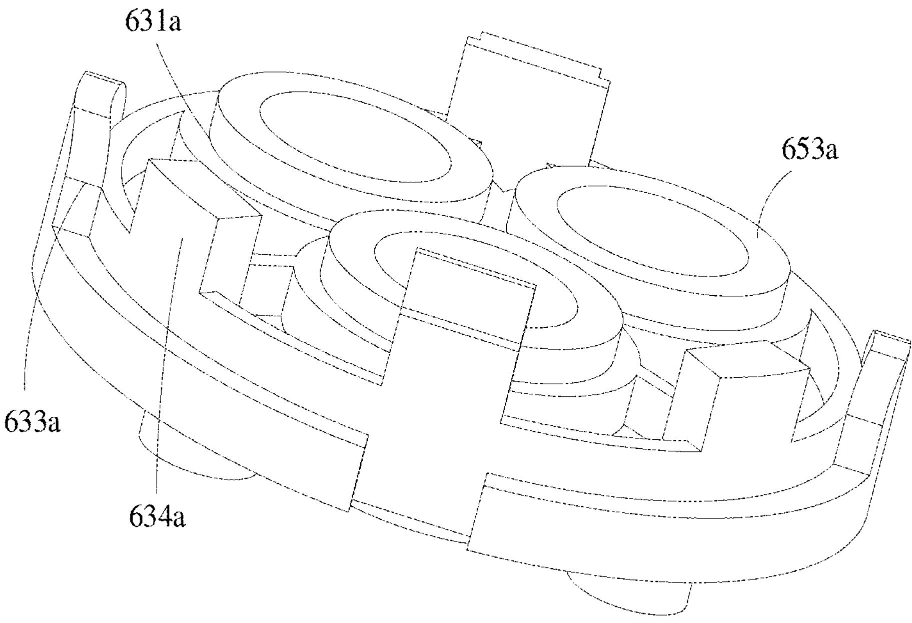
FIG. 14 is another structural diagram of the connecting member and the sealing member of the valve core assembly shown in FIG. 6.
Figure 15:
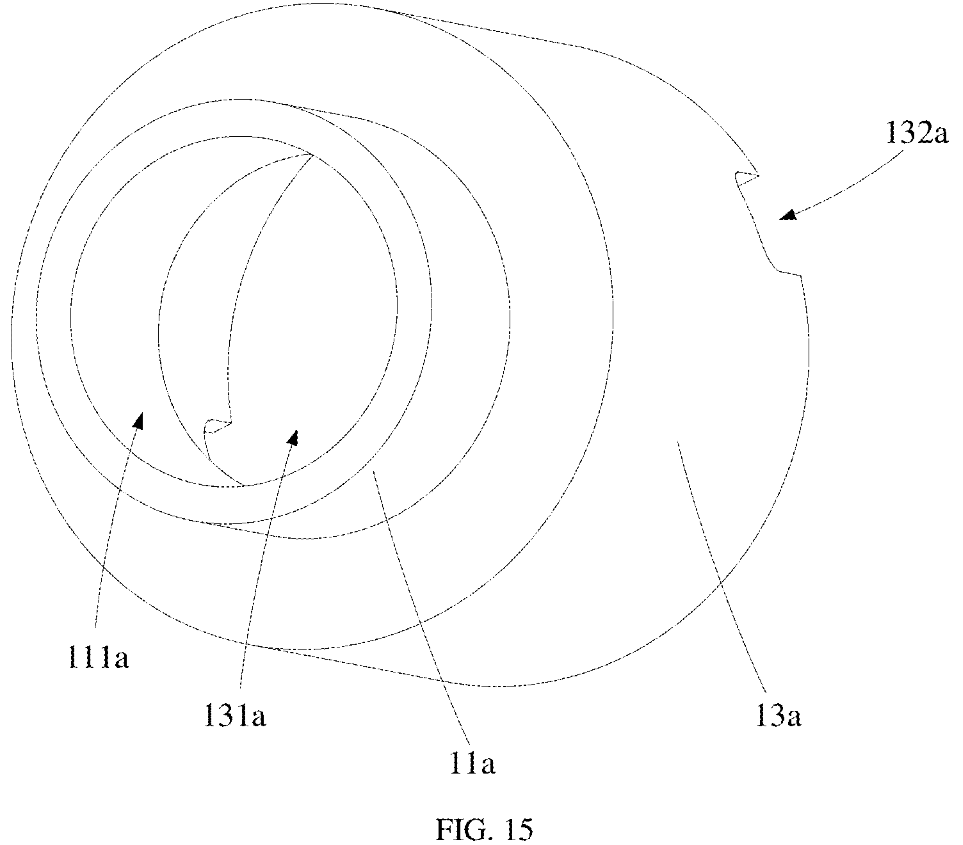
FIG. 15 is a structural diagram of a valve housing of the valve core assembly shown in FIG. 6.
Figure 16:
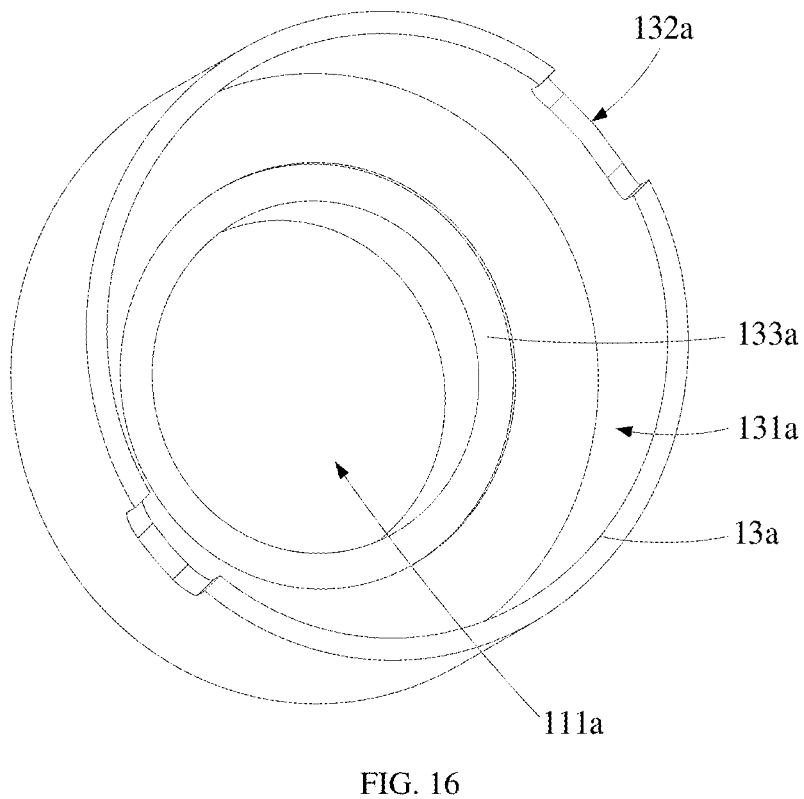
FIG. 16 is another structural diagram of the valve housing of the valve core assembly shown in FIG. 6.
Figure 17:
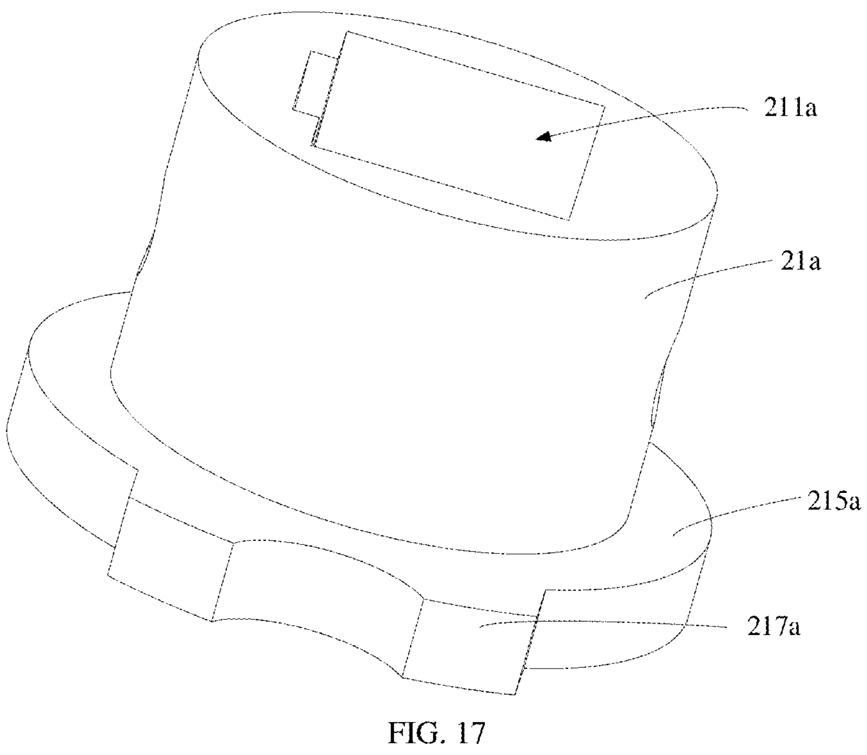
FIG. 17 is a structural diagram of a sleeve of the valve core assembly shown in FIG. 6.
Figure 18:
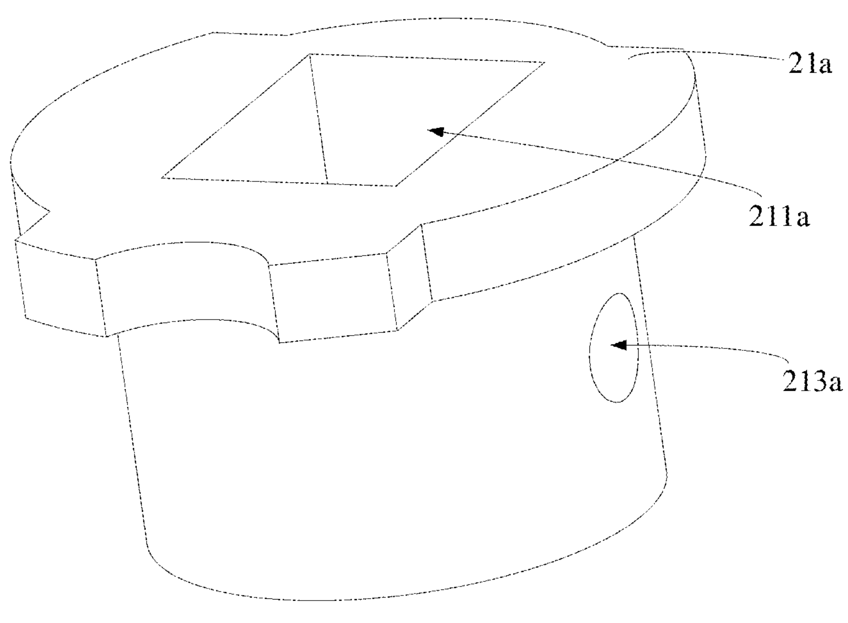
FIG. 18 is another structural diagram of the sleeve of the valve core assembly shown in FIG. 6.
Figure 19:
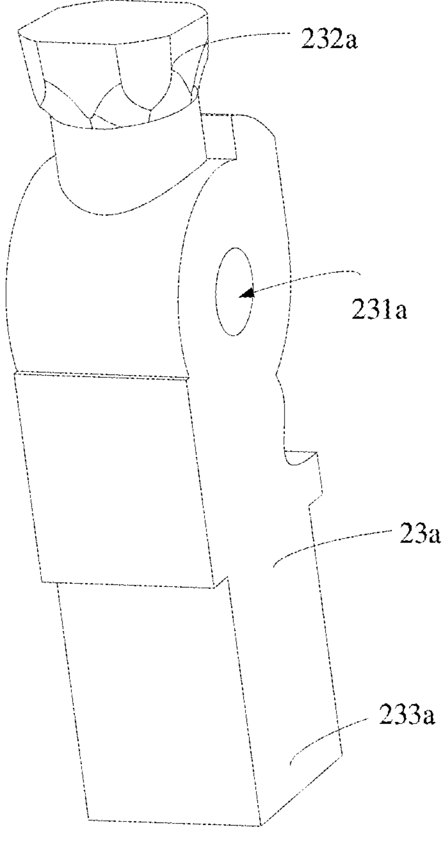
FIG. 19 is a structural diagram of an actuator of the valve core assembly shown in FIG. 6.
Figure 20:
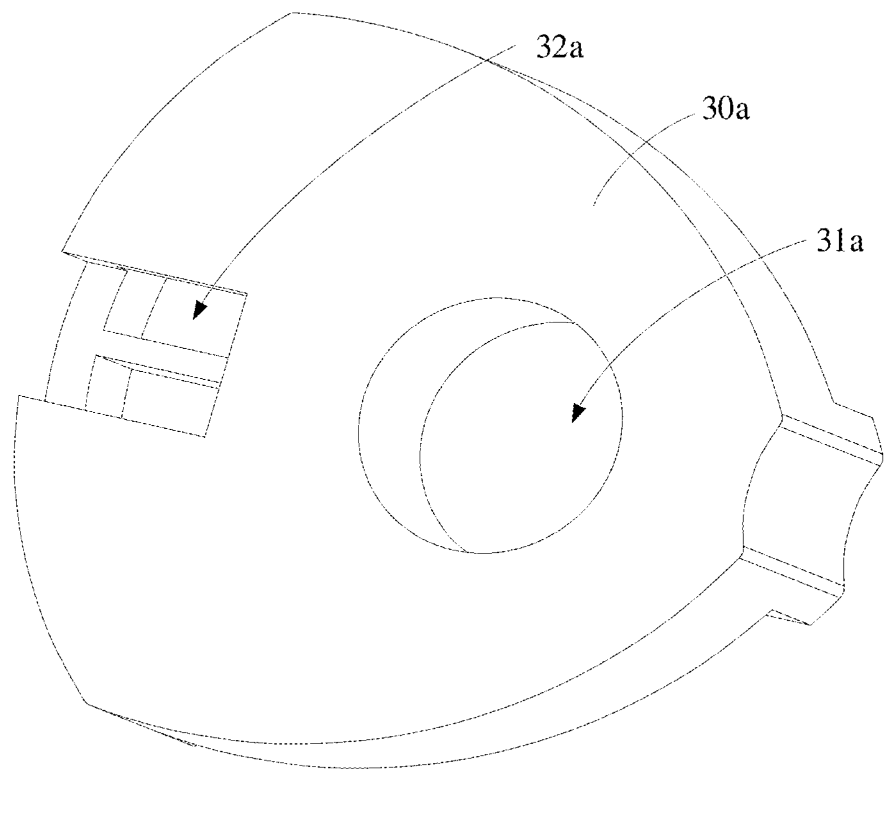
FIG. 20 is a structural diagram of a control plate of the valve core assembly shown in FIG. 6.
Figure 21:
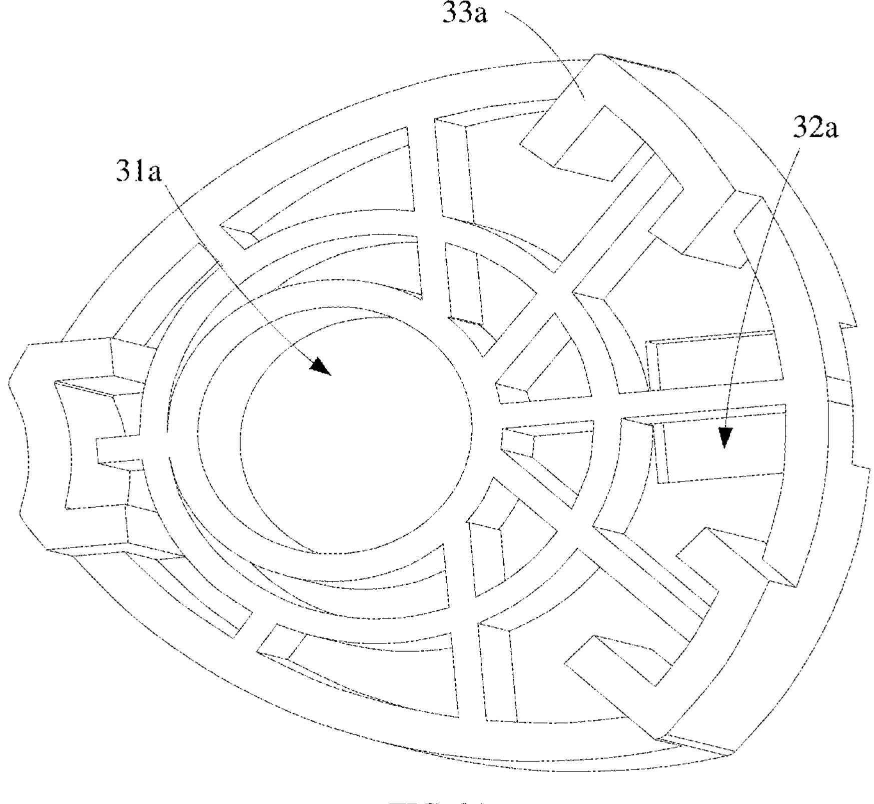
FIG. 21 is another structural diagram of the control plate of the valve core assembly shown in FIG. 6.
Figure 22:
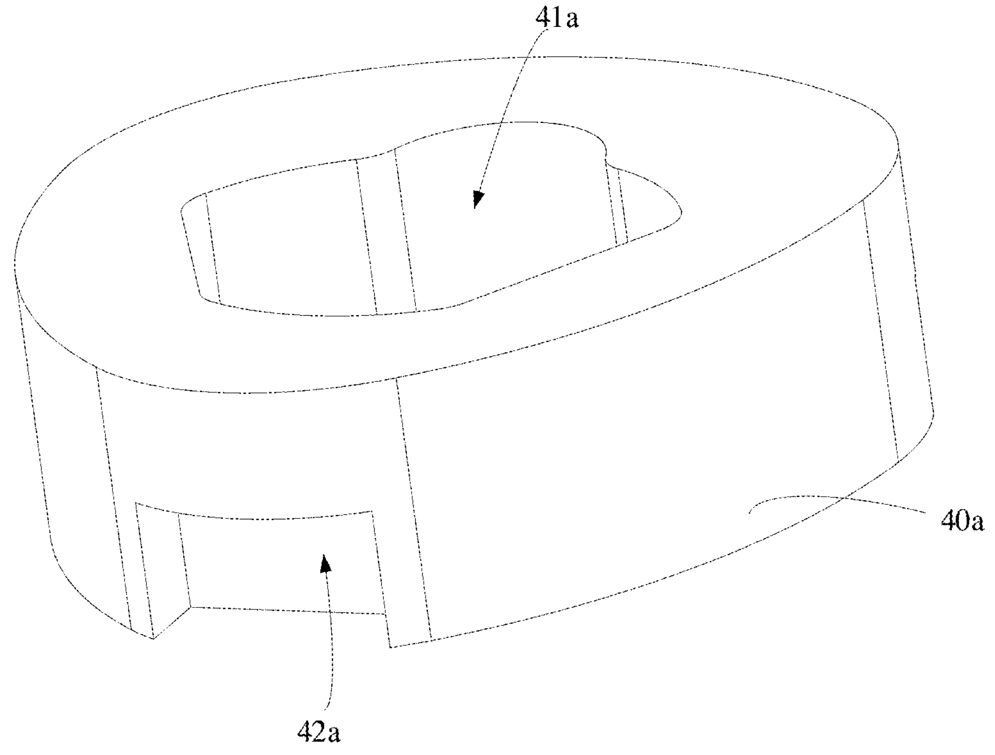
FIG. 22 is a structural diagram of a moving plate of the valve core assembly shown in FIG. 6.
Figure 23:
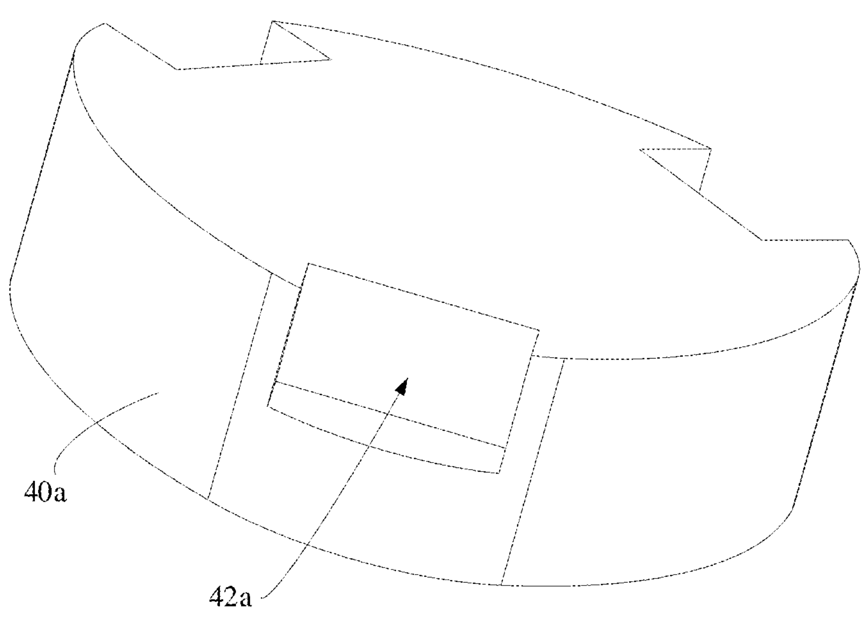
FIG. 23 is another structural diagram of the moving plate of the valve core assembly shown in FIG. 6.
Figure 24:
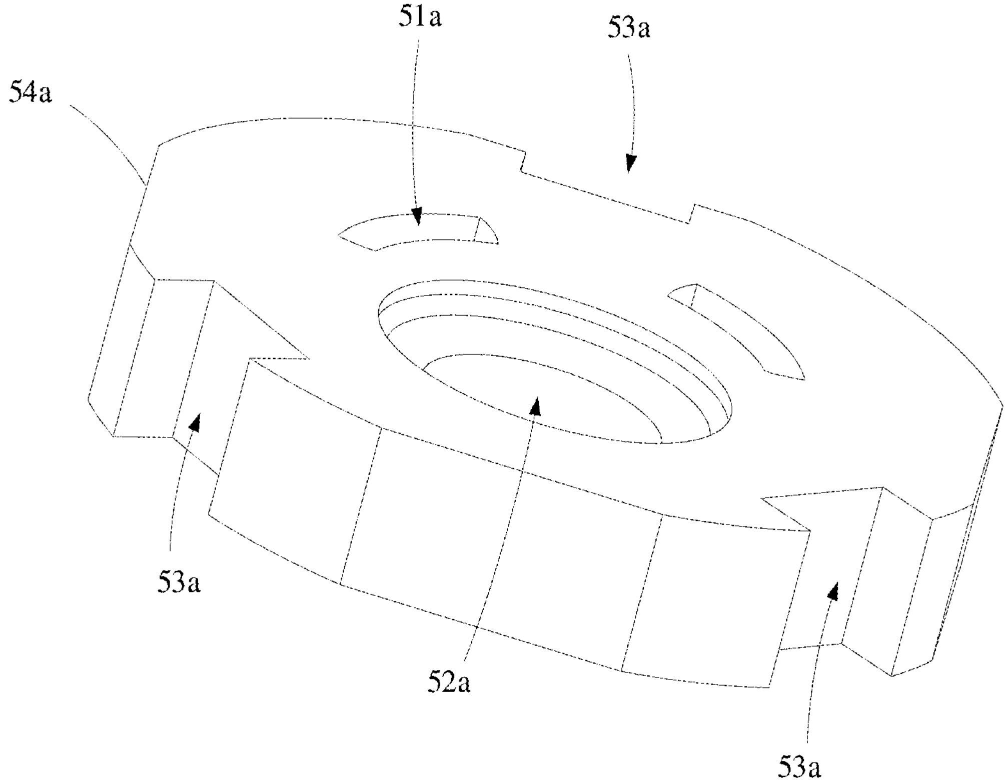
FIG. 24 is a structural diagram of a static plate of the valve core assembly shown in FIG. 6.
Figure 25:
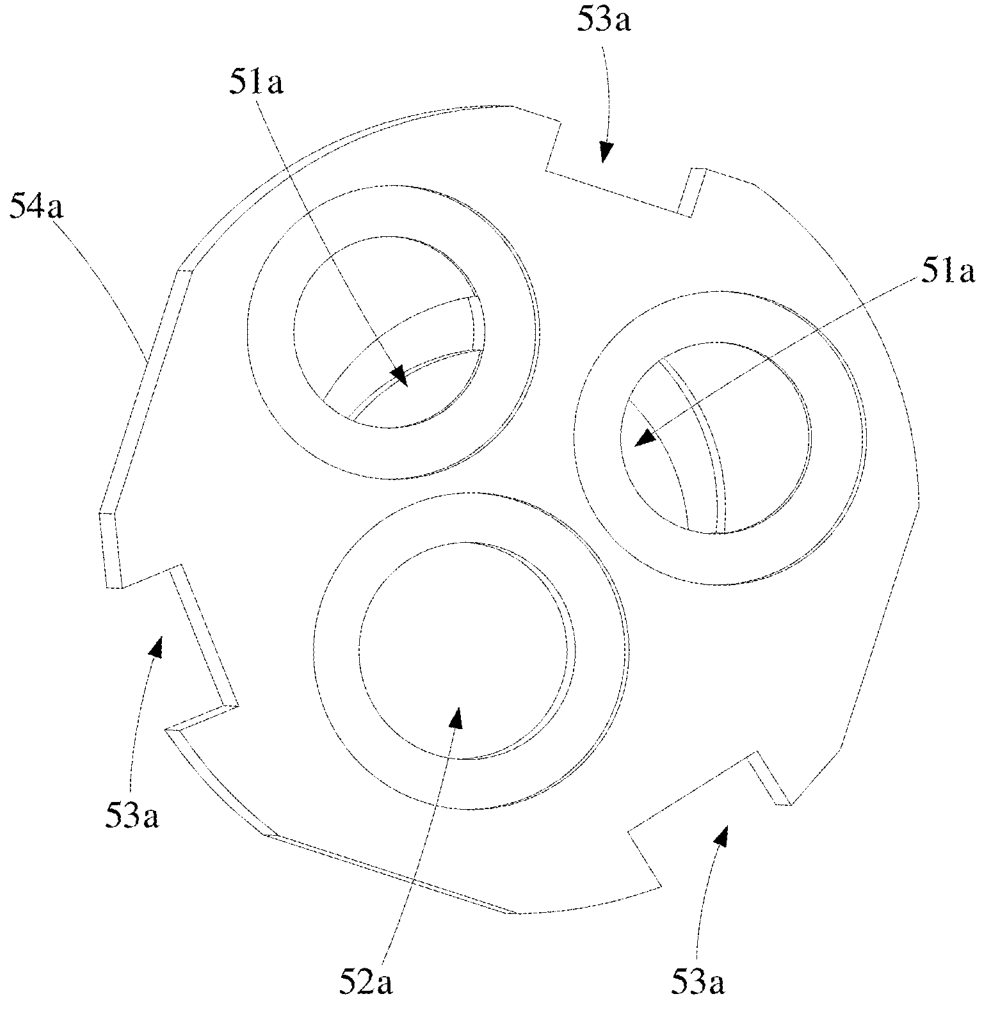
FIG. 25 is another structural diagram of the static plate of the valve core assembly shown in FIG. 6.

The exemplary embodiments described herein detail for illustrative purposes are subject to many variations in implementation. The present disclosure provides a valve core assembly. It should be emphasized, however, that the present disclosure is not limited only to what is disclosed and extends to cover various alternation to valve core assembly. It is understood that various omissions and substitutions of equivalents are contemplated as circumstances may suggest or render expedient, but these are intended to cover the application or implementation without departing from the spirit or scope of the present disclosure.

The terms “a” and “an” herein do not denote a limitation of quantity, but rather denote the presence of at least one of the referenced items.

The terms “having”, “comprising”, “including”, and variations thereof signify the presence of a component.

Please referring to FIGS. 1-5, the present disclosure provides a tap 1000 which may be a pull-out tap or a non pull-out tap. The tap 1000 includes a valve core assembly 100*a*, a hollow conduit 200 communicated with the valve core assembly 100*a*, a handle assembly 300 horizontally or obliquely connected to the hollow conduit 200, and a protective housing 400 configured to accommodate the valve core assembly 100*a*. The handle assembly 300 may be actuated or rotated up-and-down or left-and-right to open and close the valve core assembly 100*a*. The hollow conduit 200 is arranged with an outlet pipe 201 accommodated with the valve core assembly 100*a*, and the water passing through the valve core assembly 100*a* can flow out the tap 1000 by the outlet pipe 201. The outlet pipe 201 is preferred to be flexible, and may be a plastic pipe, a braided pipe, or a metal pipe.

Please referring to FIGS. 6-25, the fluid channel structure 60*a* according to a first embodiment of the present disclosure is applicable to the pull-out tap. The fluid channel structure 60*a* includes a base 61*a*, a connecting member 63*a* connected with the base 61*a*, at least three sealing members 65*a*, a first extension pipe 500*a*, a second extension pipe 600*a*, and a third extension pipe 700*a*. The base 61*a* defines at least three through holes 611*a*. The at least three through holes 611*a* are communicated with the first extension pipe 500*a*, the second extension pipe 600*a* and the third extension pipe 700*a*, respectively. The first extension pipe 500*a*, the second extension pipe 600*a* and the third extension pipe 700*a* approximately extend along an axial direction of the protective housing 400. The first extension pipe 500*a* is connected with a hot water supply, and the second extension pipe 600*a* is connected with a cold water supply. Free ends of the third extension pipe 700*a*, the first extension pipe 500*a* and the second extension pipe 600*a* all face downwards, that is, towards the ground. The connecting member 63*a* defines at least three through holes 631*a* communicated with their respective through holes 611*a*. Each sealing member 65*a* defines a through hole 651*a*. Each through hole 651*a* is communicated with the corresponding through hole 611*a* and the corresponding through holes 631*a*, to form a first inlet channel (not labeled), a second inlet channel (not labeled), and an outlet channel (not labeled); or each sealing member 65*a* is received in the corresponding through hole 631*a*, and each through hole 651*a* is communicated with the corresponding through hole 611*a*, to form the first inlet channel, the second inlet channel, and the outlet channel. Center lines of the first inlet channel, the second inlet channel and the outlet channel are substantially horizontally set, and the outlet channel is arranged between the first inlet channel and the second inlet channel.

Hot water and cold water can flow in the valve core assembly 100*a* by the first inlet channel and the second inlet channel respectively, and mix in the valve core assembly 100*a*. The mixed water can flow out of the tap 1000 after flowing through the corresponding through hole 651*a*, the corresponding through hole 631*a*, the corresponding through hole 611*a*, the third extension pipe 700*a*, and outlet pipe 201. That is, the mixed water can flow out of the tap 1000 after flowing through the outlet channel, the third extension pipe 700*a*, and the outlet pipe 201. It should be understood that the hot water from the first extension pipe 500*a* can also flow out of the tap 1000 after flowing through the outlet channel, the third extension pipe 700*a*, and the outlet pipe 201; and the cold water from the second extension pipe 600*a* can also flow out of the tap 1000 after flowing through the outlet channel, the third extension pipe 700*a*, and the outlet pipe 201.

Each through hole 611*a* has two openings on two sides of the base 61*a* respectively, and the two openings of the through hole 611*a* face towards a same direction or face towards two opposite directions respectively. In one embodiment, projections of the two openings on the connecting member 63*a* approximately overlap with each other.

Each sealing member 65*a* is accommodated in one corresponding through hole 631*a*. When the base 61*a* is connected with the connecting member 63*a*, the sealing member 65*a* is connected between the base 61*a* and the connecting member 63*a* to prevent a leakage. Each sealing member 65*a* includes a first end 652*a* and a second end 653*a*. A size of each through hole 651*a* is no smaller than that of the corresponding through hole 611*a*, so that each sealing member 65*a* surrounds the corresponding through hole 611*a*. The size of each through hole 651*a* is smaller than that of the corresponding through hole 631*a*, and each sealing member 65*a* is received in the corresponding through hole 631*a*; or a size of each through hole 651*a* is larger than that of the corresponding through hole 631*a*, and each sealing member 65*a* surrounds the corresponding through hole 611*a* and the corresponding through hole 631*a*. In one embodiment, the first end 652*a* of each sealing member 65*a* is arranged outside the corresponding through hole 631*a* and tightly pressed between the base 61*a* and the connecting member 63*a* to prevent the leakage between the base 61*a* and the connecting member 63*a*.

The base 61*a* may have a plate structure, and a thickness of the base 61*a* may be about 1-3 mm, for example, the thickness of the base 61*a* is 1 mm, 2 mm, or 3 mm.

A diameter of the first extension pipe 500*a* may be about 0.6-2 cm, for example, the diameter of the first extension pipe 500*a* is 0.6 cm, 1 cm, 1.5 cm, or 2 cm.

A length of the first extension pipe 500*a* may be about 10-30 cm, for example, the length of the first extension pipe 500*a* is 10 mm, 15 mm, 20 mm, 25 mm, or 30 mm.

A diameter of the second extension pipe 600*a* may be about 0.6-2 cm, for example, the diameter of the second extension pipe 600*a* is 0.6 cm, 1 cm, 1.5 cm, or 2 cm.

A length of the second extension pipe 600*a* may be about 10~30 cm, for example, the length of the second extension pipe 600*a* is 10 mm, 15 mm, 20 mm, 25 mm, or 30 mm.

A diameter of the third extension pipe 700*a* may be about 0.6-2 cm, for example, the diameter of the third extension pipe 700*a* is 0.6 cm, 1 cm, 1.5 cm, or 2 cm.

A length of the third extension pipe 700*a* may be about 15-40 cm, for example, the length of the third extension pipe 700*a* is 10 mm, 15 mm, 20 mm, 25 mm, 30 mm, 35 mm, or 40 mm.

One of the base 61*a* and the connecting member 63*a* defines a connecting hole 612*a*, and the other one is provided with a connecting column 632*a*, the connecting column 632*a* is received in the connecting hole 612*a* to connect the base 61*a* with the connecting member 63*a*. When the base 61*a* has the plate structure, the base 61*a* defines the connecting hole 612*a*, and the connecting member 63*a* is protruded with the connecting column 632*a*.

In one embodiment, the base 61*a* is integratedly formed with the connecting member 63*a* by injection molding. The base 61*a* and the connecting member 63*a* may be made of the same material or different materials, such as metal (including stainless steel, copper, and the like) or plastic (preferably rigid plastic).

The base 61*a*, the first extension pipe 500*a*, the second extension pipe 600*a* and the third extension pipe 700*a* may be integratedly formed with each other, and may also be made of the same material or different materials, such as metal (including stainless steel, copper, and the like) or plastic (preferably rigid plastic). In one embodiment, the base 61*a*, the first extension pipe 500*a*, the second extension pipe 600*a*, and the third extension pipe 700*a* are made of plastic (preferably rigid plastic) and formed by injection molding. In another embodiment, the base 61*a*, the first extension pipe 500*a*, the second extension pipe 600*a* and the third extension pipe 700*a* are made of metal (including stainless steel, copper, and the like), the base 61*a*, the first extension pipe 500*a*, the second extension pipe 600*a* and the third extension pipe 700*a* may be formed separately, and then welded together or threadedly connected together. In a further embodiment, the base 61*a* is made of plastic (preferably rigid plastic) and the first extension pipe 500*a*, the second extension pipe 600*a* and the third extension pipe 700*a* are made of metal (including stainless steel, copper, and the like), the base 61*a* may be threadedly connected with the first extension pipe 500*a*, the second extension pipe 600*a* and the third extension pipe 700*a*. In another embodiment, the base 61*a* is made of metal (including stainless steel, copper, and the like), and the first extension pipe 500*a*, the second extension pipe 600*a* and the third extension pipe 700*a* are made of plastic (preferably rigid plastic), the base 61*a* may be threadedly connected with the first extension pipe 500*a*, the second extension pipe 600*a* and the third extension pipe 700*a*.

Each of the first extension pipe 500*a*, the second extension pipe 600*a* and the third extension pipe 700*a* includes a first sub extension pipe 501*a* communicated with the through hole 611*a*, and a connecting part 502*a* connected with one end of the first sub extension pipe 501*a*. The first sub extension pipe 501*a* may be made of metal (including stainless steel, copper, and the like) or plastic (preferably rigid plastic). The third extension pipe 700*a* further includes a second sub extension pipe 701*a* connected with the first sub extension pipe 501*a*. The connecting part 502*a* of the third extension pipe 700*a* is connected with one end of the second sub extension pipe 701*a* away from the base 61*a*. The second sub extension pipe 701*a* may be made of metal (including stainless steel, copper, and the like) or plastic, and welded with or threadedly connected with the first sub extension pipe 501*a*, and the second sub extension pipe 701*a* is preferred to be a plastic flexible pipe. The connecting part 502*a* may be made of metal (including stainless steel, copper, and the like) or plastic (preferably rigid plastic), and welded with or threadedly connected with the second sub extension pipe 701*a*. A free end of each connecting part 502*a* is provided with a threaded portion 5021*a*, and the threaded portion 5021*a* may an internal thread or an external thread, preferably an internal thread. The first sub extension pipe 501*a* substantially extends along the axial direction of the protective housing 400, and the threaded portion 5021*a* extends out of the protective housing 400, so it is convenient to connect the hot water supply, the cold water supply and the outlet pipe 201 with the threaded portions 5021*a*, or separate the hot water supply, the cold water supply and the outlet pipe 201 from the threaded portions 5021*a*, and the tap 1000 using the fluid channel structure 60*a* in consequence may be assembled or disassembled conveniently. In another embodiment, the third extension pipe 700*a* has an integrated structure, a length of the third extension pipe 700*a* is greater than that of the first extension pipe 500*a* or the second extension pipe 600*a*. One end of each of the first extension pipe 500*a*, the second extension pipe 600*a* and the third extension pipe 700*a* is connected with the base 61*a*, and the other end of each of the first extension pipe 500*a*, the second extension pipe 600*a* and the third extension pipe 700*a* is provided with the threaded portion 5021*a*.

The base 61*a* is welded with the first extension pipe 500*a*, the second extension pipe 600*a* and the third extension pipe 700*a*, and three welding parts 503*a* are formed to tightly connect the base 61*a* with the first extension pipe 500*a*, the second extension pipe 600*a* and the third extension pipe 700*a*. The welding part 503*a* may be arranged in the through hole 611*a*, arranged on a first periphery of the through hole 611*a* facing the connecting member 63*a*, or arranged on a second periphery of the through hole 611*a* facing the connecting member 63*a*.

The valve core assembly 100*a* further includes a valve structure which is connected with the fluid channel structure 60*a* to open and close the fluid channel structure 60*a*. The valve structure includes a valve housing 10*a*, an actuator 20*a*, a control plate 30*a*, a moving plate 40*a*, and a static plate 50*a*.

The valve housing 10*a* includes a first end 11*a* and a second end 13*a*. The first end 11*a* defines a first cavity 111*a*, and the second end 13*a* defines a second cavity 131*a*. In one embodiment, the second cavity 131*a* includes a bigger circumference area than the first cavity 111*a*.

The fluid channel structure 60*a* may be detachably connected to the valve housing 10*a* by a connecting structure. The connecting structure includes at least one projection 633*a* and at least one fixing groove 132*a*. The projection 633*a* is detachably received in the fixing groove 132*a*. In one embodiment, the surface of the connecting member 63*a* away from the base 61*a* includes the at least one projection 633*a*, the side surface of the valve housing 10*a* defines the at least one fixing groove 132*a*, and the at least one projection 633*a* is detachably received in the at least one fixing groove 132*a*, to detachably connect the valve housing 10*a* with the base 61*a*. In one embodiment, the side surface of the second end 13*a* defines the at least one fixing groove 132*a*.

Specifically, the at least one projection 633*a* includes a plurality of projections 633*a*, which are arranged along the periphery of the connecting member 63*a* and extended away from the base 61*a*. The at least one fixing groove 132*a* includes a plurality of fixing grooves 132*a*, which are arranged along the side surface of the valve housing 10*a*. Preferably, the side surface of the second end 13*a* defines the fixing grooves 132*a*.

The bottom wall of the second end 13*a* defines a support groove 133*a*, the support groove 133*a* is homocentric with the second cavity 131*a*. The first cavity 111*a* is communicated with the second cavity 131*a*, in detail, the bottom wall shared by the second end 13*a* and the first end 11*a* defines a through hole (not marked) for communicating the first cavity 111*a* with the second cavity 131*a*, and the support groove 133*a* is also communicated with the through hole.

The actuator 20*a* is rotatably arranged in the valve housing 10*a*. The actuator 20*a* includes a sleeve 21*a*, an actuating rod 23*a*, a positioning hole 213*a*, a positioning hole 231*a* and a positioning part 25*a*. The sleeve 21*a* includes a sleeve cavity 211*a* and a flange 215*a*. The sleeve 21*a* is rotatably arranged in the first cavity 111*a*. The actuating rod 23*a* is arranged in the sleeve cavity 211*a*. The positioning holes 213*a* and 231*a* are defined in the side surfaces of the sleeve 21*a* and the actuating rod 23*a*, respectively. The positioning hole 213*a* and the positioning hole 231*a* are collinearly aligned when the actuating rod 23*a* is arranged in the sleeve cavity 211*a*. In addition, the positioning part 25*a* is engagingly disposed in the positioning hole 213*a* and the positioning hole 231*a* to couple the actuating rod 23*a* in the sleeve cavity 211*a*.

The handle assembly 300 includes a handle 31, a cover 32 connected with the handle 31, and a connecting element 33 partially arranged in the cover 32. The handle 31 is protruded from a side of the cover 32. The cover 32 has a receiving cavity 322 and a fixing part 321 located in the receiving cavity 322. A first end of the connecting element 33 is rotatably arranged in the receiving cavity 322. The connecting element 33 defines a through hole 331. An end 233*a* of the actuating rod 23*a* is fixed in the fixing part 321 after passing through the through hole 331, to connect the handle assembly 300 with the actuator 20*a*. An outer surface of a second end of the connecting element 33 is provided with a thread 333.

The control plate 30*a* is arranged in the second cavity 131*a* of the valve housing 10*a* and connected with the actuator 20*a*. The control plate 30*a* defines a rod cavity 31*a* used to receive an actuating end 232*a* of the actuating rod 23*a*. The control plate 30*a* includes a plurality of protrusions 33*a* arranged along a peripheral of the control plate 30*a*. In addition, the control plate 30*a* further defines a groove 32*a*, and the flange 215*a* is provided with two bulges 217*a*. When the control plate 30*a* rotates, the bulge 217*a* covers or exposes the groove 32*a* to regulate the water temperature.

The moving plate 40*a* is connected to the control plate 30*a* and arranged in the second cavity 131*a* of the valve housing 10*a*. When the actuator 20*a* is actuated, the control plate 30*a* rotates or slides the actuating plate 40*a*. The moving plate 40*a* defines a plurality of receiving grooves 42*a* arranged along a circumference of the moving plate 40*a*. The control plate 30*a* includes a plurality of protrusions 33*a* arranged along a circumference of the control plate 30*a*. The protrusions 33*a* is received in the receiving grooves 42*a*, to detachably connect the movable plate 40*a* with the control plate 30*a*.

The static plate 50*a* is arranged in the second cavity 131*a* of the valve housing 10*a* and adjacent to the moving plate 40*a*. The static plate 50*a* defines at least two through holes 51*a* and at least one through hole 52*a*. The through hole 51*a* is communicated with the corresponding through hole 611*a* and the corresponding through hole 631*a*, and the through hole 52*a* is communicated with the corresponding through hole 611*a* and the corresponding through hole 631*a*. Specifically, the through holes 51*a* are communicated with the first extension pipe 500*a* and the second extension pipe 600*a* by the corresponding through holes 611*a* and the corresponding through holes 631*a*, and the through hole 52*a* is communicated with the third extension pipe 700*a* by the corresponding through hole 611*a* and the corresponding through hole 631*a*. The moving plate 40*a* covers the through hole 51*a* and the through hole 52*a*, and the moving plate 40*a* further defines a communicating groove 41*a*. When the moving plate 40*a* rotates, the communicating groove 41*a* can communicate the through hole 52*a* with the through hole 51*a* corresponding to the first extension pipe 500*a*, communicate the through hole 52*a* with the through hole 51*a* corresponding to the second extension pipe 600*a*, or communicate the through hole 52*a* with the through hole 51*a* corresponding to the first extension pipe 500*a* and the through hole 51*a* corresponding to the second extension pipe 600*a*, to output hot water, cold water or mixed water. The through hole 51*a* is arc shaped, a size of the through hole 51*a* is smaller than that of the through hole 52*a*, so as to reduce the water flow rate and mix the cold water and hot water completely.

Each sealing member 65*a* is partially received in one corresponding through hole 631*a*. A second end 653*a* of each sealing member 65*a* protrudes from a second surface of the connecting member 63*a* and extends towards the static plate 50*a*. The second end 653*a* of each sealing member 65*a* is pressed between the static plate 50*a* and the connecting member 63*a* to prevent a leakage. Each second end 653*a* surrounds the corresponding through hole 51*a* or the corresponding through hole 52*a*. Specifically, a size of the through hole 651*a* is larger than that of the through hole 51*a* or the through hole 52*a*, so that the second end 653*a* can surround the corresponding through hole 51*a* or the corresponding through hole 52*a*.

The fluid channel structure 60*a* is detachably connected to the static plate 50*a* by a connecting structure, the static plate 50*a* is located in the second cavity 131*a* when the fluid channel structure 60*a* is detachably connected to the valve housing 10*a*. The connecting structure includes at least one protrusion 634*a* and at least one fixing groove 53*a*. In one embodiment, there are a plurality of protrusions 634*a*, the protrusions 634*a* may have the same shape or have different shapes, the protrusions 634*a* are arranged along an outer circumference of the connecting member 63*a*, and the protrusions 633*a* surround the protrusions 634*a*. The protrusions 634*a* are received in the fixing grooves 53*a*, respectively. The protrusions 634*a* surround the through holes 631*a*. The fixing groove 53*a* is arranged on the outer side of the static plate 50*a*.

The protective housing 400 includes a housing 45 and a connecting column 46 substantially perpendicularly connected to the housing 45. The housing 45 defines a via hole 451 and a receiving cavity 452, the connecting column 46 defines a receiving cavity 461 communicated with the via hole 451 and the receiving cavity 452. The fluid channel structure 60*a* and the valve structure are at least partially accommodated in the receiving cavity 461. An end of the connecting element 33 away from the handle 31 is received in the receiving cavity 461. Specifically, the connecting column 46 includes an internal thread 4611 facing an inner of the receiving cavity 461, the connecting element 33 includes an external thread 333, and the connecting column 42 is threaded with the connecting element 33. The first extension pipe 500*a*, the second extension pipe 600*a*, and the third extension pipe 700*a* are received in the receiving cavity 452 and communicated with the corresponding through holes 611*a*. One end of the outlet pipe 201 is received in the receiving cavity 452 and communicated with the third extension pipe 700*a*. The valve core assembly 100*a* is received in a space formed by the handle assembly 300 and the protective housing 400, that is, the valve core assembly 100*a* is received in the receiving cavity 452 and the receiving cavity 461. The end of the connecting column 46 away from the handle assembly 300 is provided with a bracket 462 which is used to support the fluid channel structure 60*a*, and the other end of the connecting element 33 is threaded with the connecting column 46 to mount the fluid channel structure 60*a* and the valve structure in the receiving cavity 461. The bracket 462 defines a through hole 463 communicated with the receiving cavity 461 and the receiving cavity 452. The base 61*a* includes a base body 613*a* and a protruding part 614*a* projected from the base body 613*a*. The base body 613*a* and the protruding part 614*a* jointly form a step portion 616*a*, and the step portion 616*a* is supported by the bracket 462. The bracket 462 disposed in the connecting column 46 mounts the fluid channel structure 60*a* and the valve structure in the receiving cavity 461 of the connecting column 46 to communicate with the receiving cavity 461.

The base 61*a* or the bracket 462 defines at least one notch 615*a*. The notch 615*a* allows the base 61*a* to conveniently enter into the receiving cavity 461 through the through hole 463. In one embodiment, the base body 613*a* or bracket 462 defines two opposite notches 615*a*. In another embodiment, the base body 613*a* and the protruding part 614*a* cooperatively define the notch 615*a*.

The maximum depth $D_1$ of the notch 615*a* is about 1-3 mm. For example, the maximum depth $D_1$ of the notch 615*a* is about 1 mm, 1.5 mm, 2 mm, 2.1 mm, 2.5 mm, or 3 mm.

The vertical distance $D_2$ between the first end wall 6151*a* and the second end wall 6152*a* of the notch 615*a* is about 6-10 mm. For example, the vertical distance $D_2$ between the first end wall 6151*a* and the second end wall 6152*a* is about 6 mm, 6.5 mm, 7 mm, 7.5 mm, 8 mm, 8.1 mm, 8.5 mm, 9 mm, 9.5 mm, or 10 mm.

The notch 615*a* has an arc structure with a radius of about 3-7 mm. For example, the notch 615*a* has a radius of about 3 mm, 4 mm, 5 mm, 6 mm, 7 mm, or 8 mm.

Figure 26:
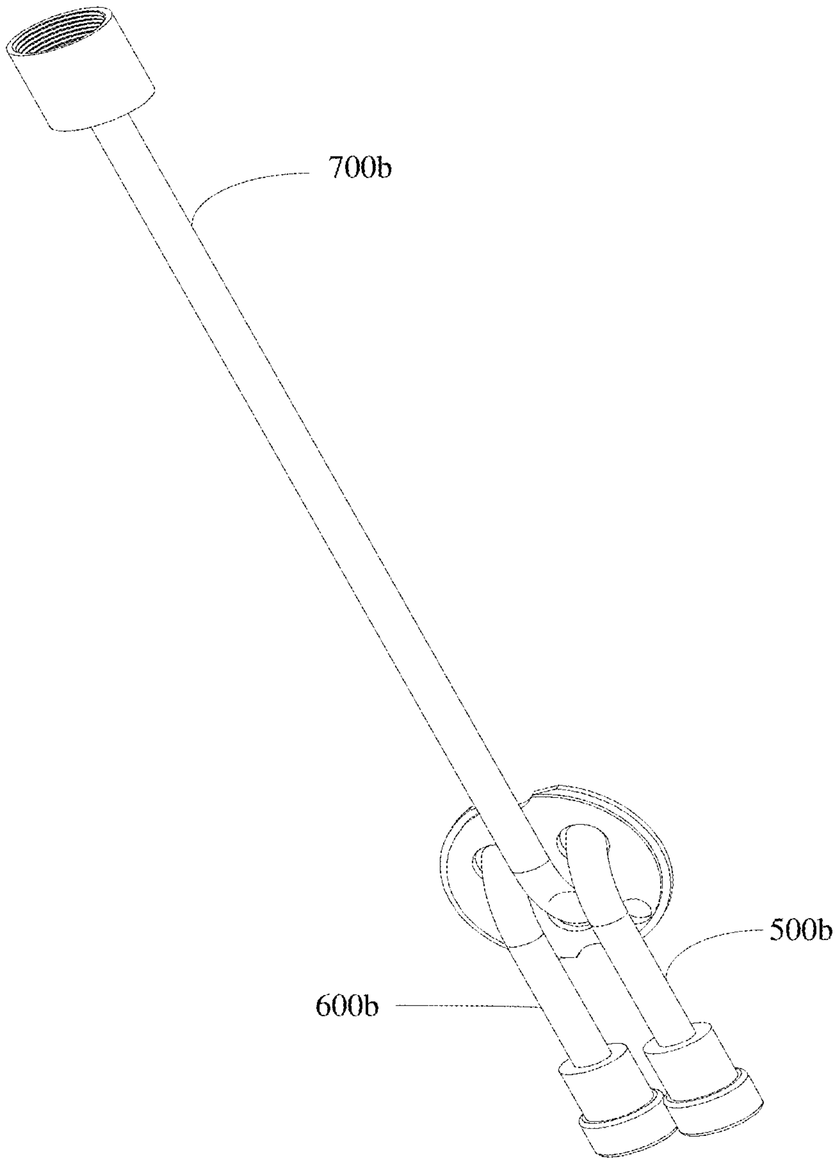
FIG. 26 is a structural diagram of a fluid channel structure according to a second embodiment of the present disclosure.
Figure 27:
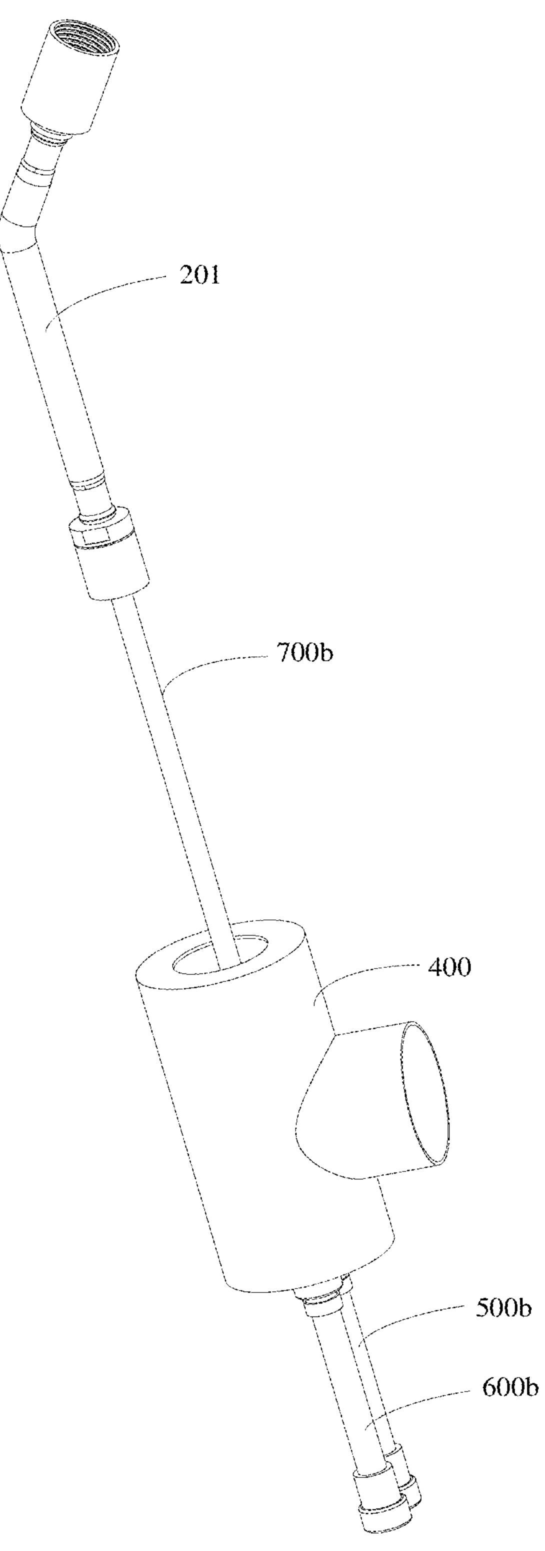
FIG. 27 is a structural diagram of an outlet pipe and the protective housing of the tape and the fluid channel structure shown in FIG. 26.

Please referring to FIGS. 26 to 27. The second embodiment of the present disclosure provides a fluid channel structure 60*b*. The fluid channel structure 60*b* is used for non-pulling taps. The fluid channel structure 60*b* in Example 2 has a similar structure with the fluid channel structure 60*a* in Example 1. The differences between the two are at least as follows: the free end of the third extension pipe 700*b* faces upward, that is, back to the ground, and the free end of the first extension pipe 500*b* and the second extension pipe 600*b* faces downward, that is, toward the ground.

Please referring to FIGS. 26-27, the present disclosure provides a fluid channel structure 60*b* according to a second embodiment. The fluid channel structure 60*b* is applicable to non pull-out tap. The fluid channel structure 60*b* of the second embodiment has a similar structure with the fluid channel structure 60*a* of the first embodiment. The differences between the two at least include: the free end of the third extension pipe 700*b* extends upward, that is, extends away from the ground, and the free ends of the first extension pipe 500*b* and the second extension pipe 600*b* extends downward, that is, extends toward the ground.

Figure 28:
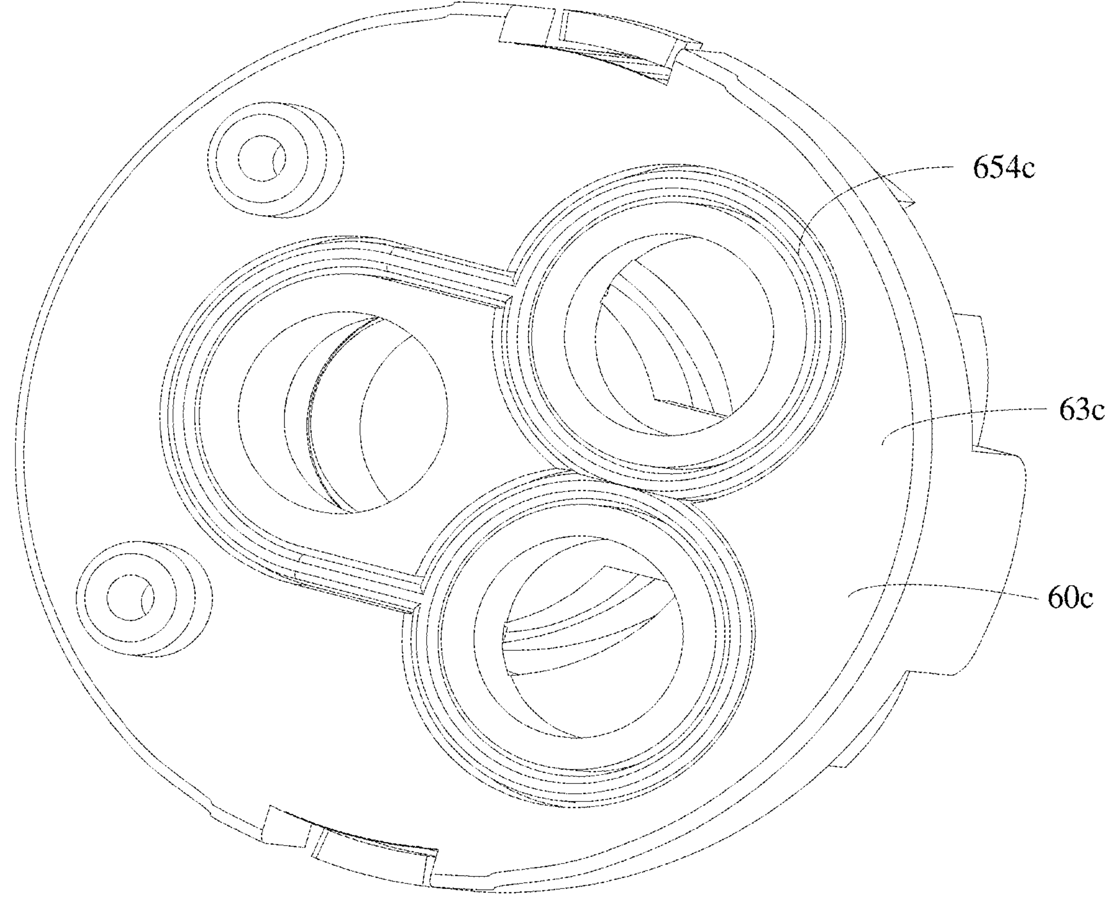
FIG. 28 is a structural diagram of a fluid channel structure according to a third embodiment of the present disclosure.
Figure 29:
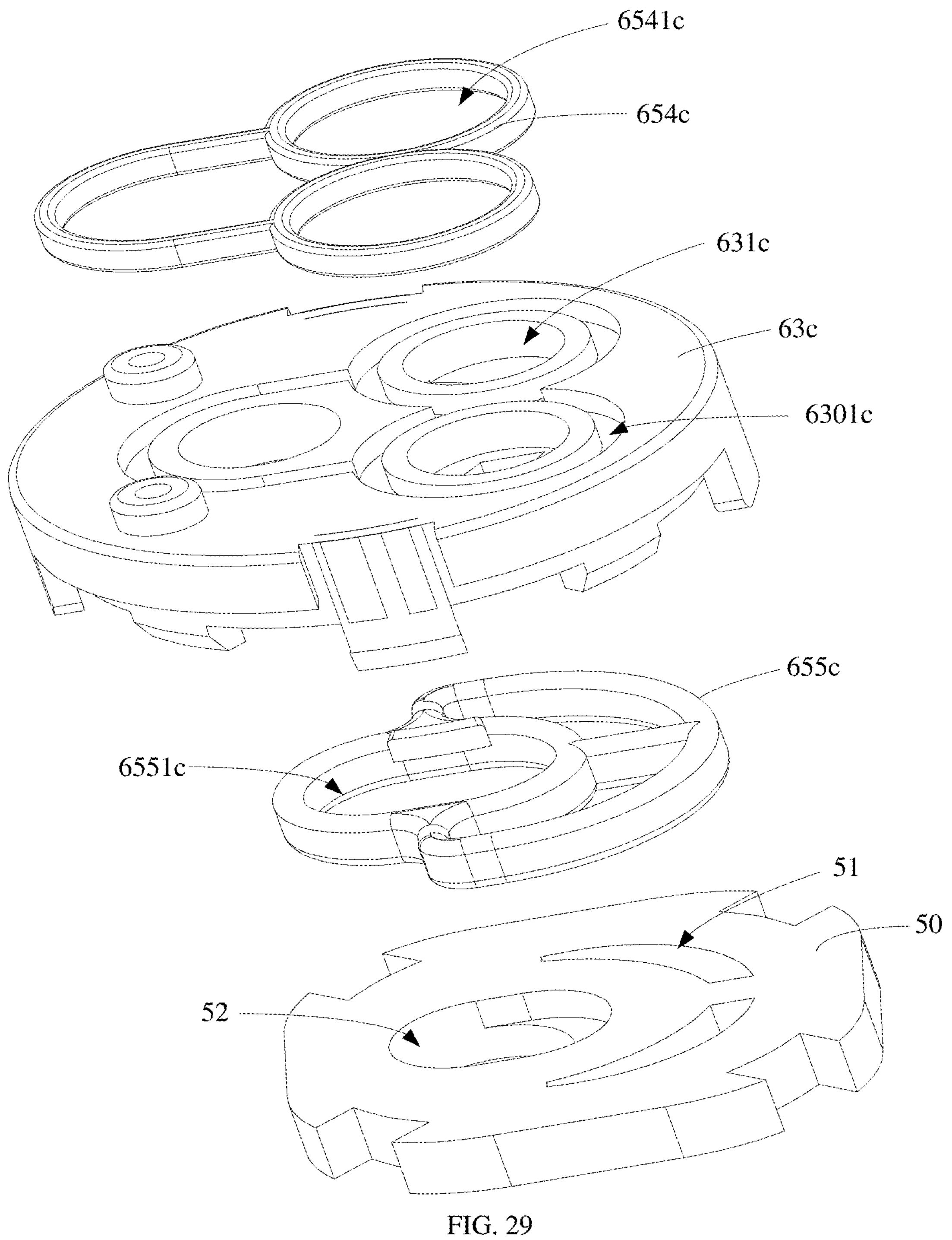
FIG. 29 is an exploded view of sealing rings, the connecting member and the static plate shown in FIG. 28.
Figure 30:
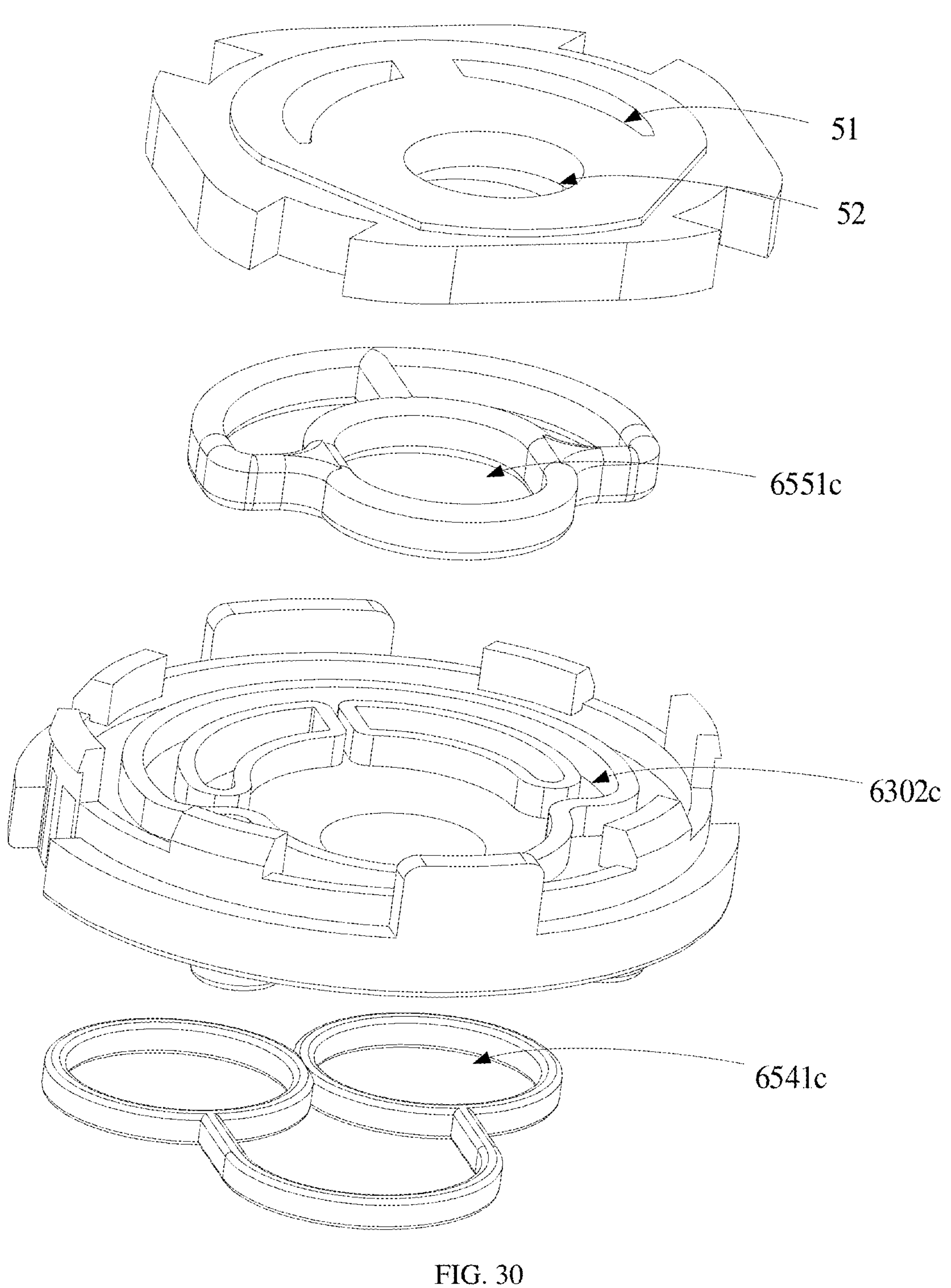
FIG. 30 is another exploded view of the sealing rings, the connecting member and the static plate shown in FIG. 28.

Please referring to FIGS. 28-30, the present disclosure provides a fluid channel structure 60*c* according to a third embodiment. The fluid channel structure 60*c* is applicable to pull-out tap or non pull-out tap. The fluid channel structure 60*c* of the third embodiment has a similar structure with the fluid channel structure 60*a* of the first embodiment or the fluid channel structure 60*b* of the second embodiment. The differences between the two at least include: the fluid channel structure 60*c* includes a first sealing ring 654*c* and a second sealing ring 655*c*, the first sealing ring 654*c* is clamped between the base and the connecting member 63*c*, and the second sealing ring 655*c* is clamped between the connecting member 63*c* and the static plate 50. The first sealing ring 654*c* defines at least three through holes 6541*c*, each of the through holes 6541*c* is communicated with one corresponding through hole 611*c* and one corresponding through hole 631*c*. The second sealing ring 655*c* defines at least three through holes 6551*c*, each of the through holes 6551*c* is communicated with one corresponding through hole 631*c* and one corresponding through hole 51/52. Two sides of the connecting member 63*c* respectively define a receiving groove 6301*c* for receiving the first sealing ring 654*c* and a receiving groove 6302*c* for receiving the second sealing ring 655*c*. The receiving groove 6301*c* and the receiving groove 6302*c* are arranged around the through holes 631*c*.

Figure 31:
FIG. 31 is a structural diagram of a part of a fluid channel structure according to a fourth embodiment of the present disclosure.
Figure 31:
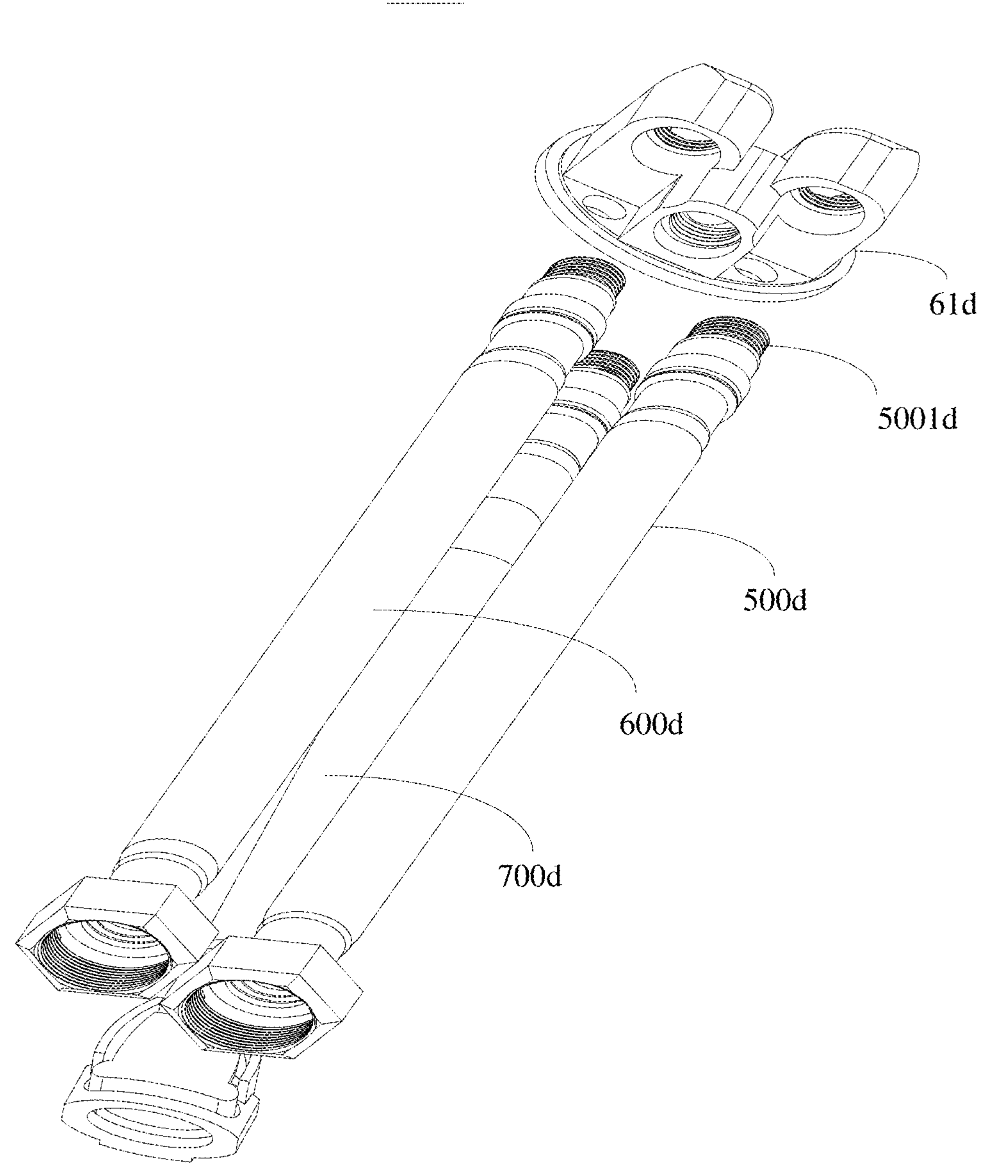
Figure 32:
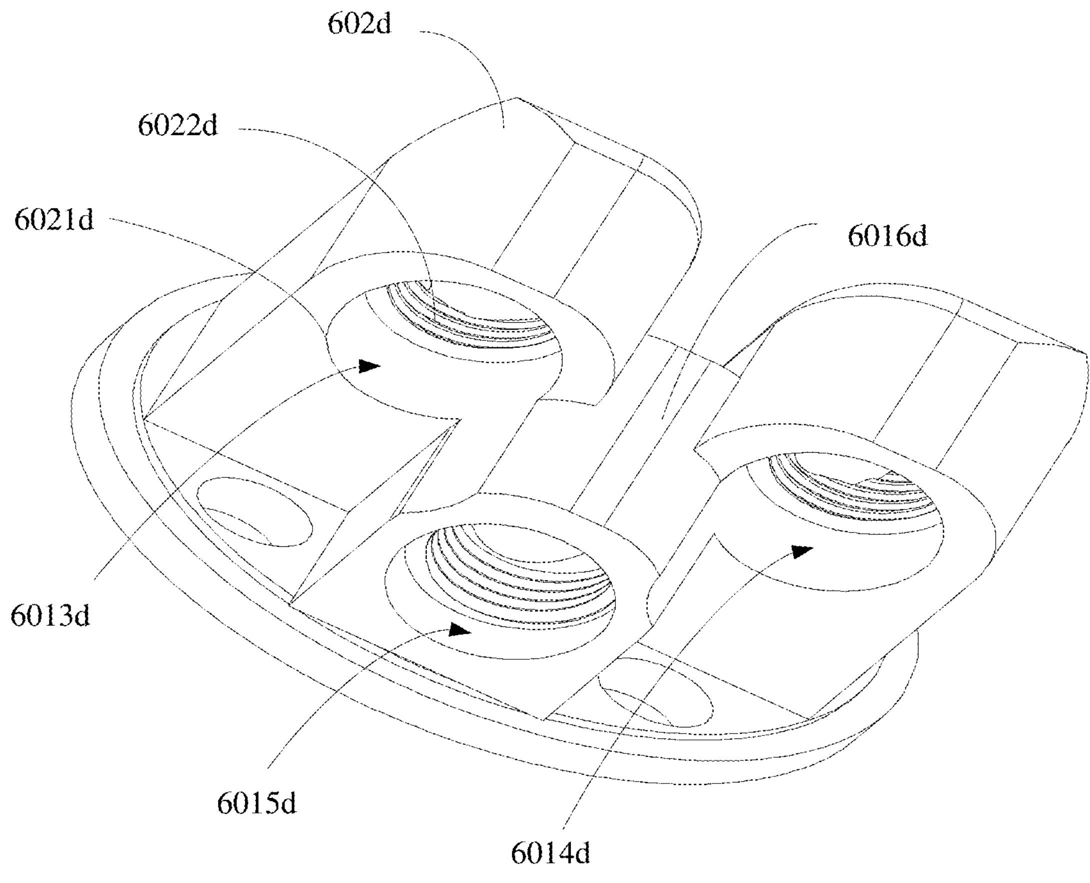
FIG. 32 is a structural diagram of a base shown in FIG. 31.
Figure 33:
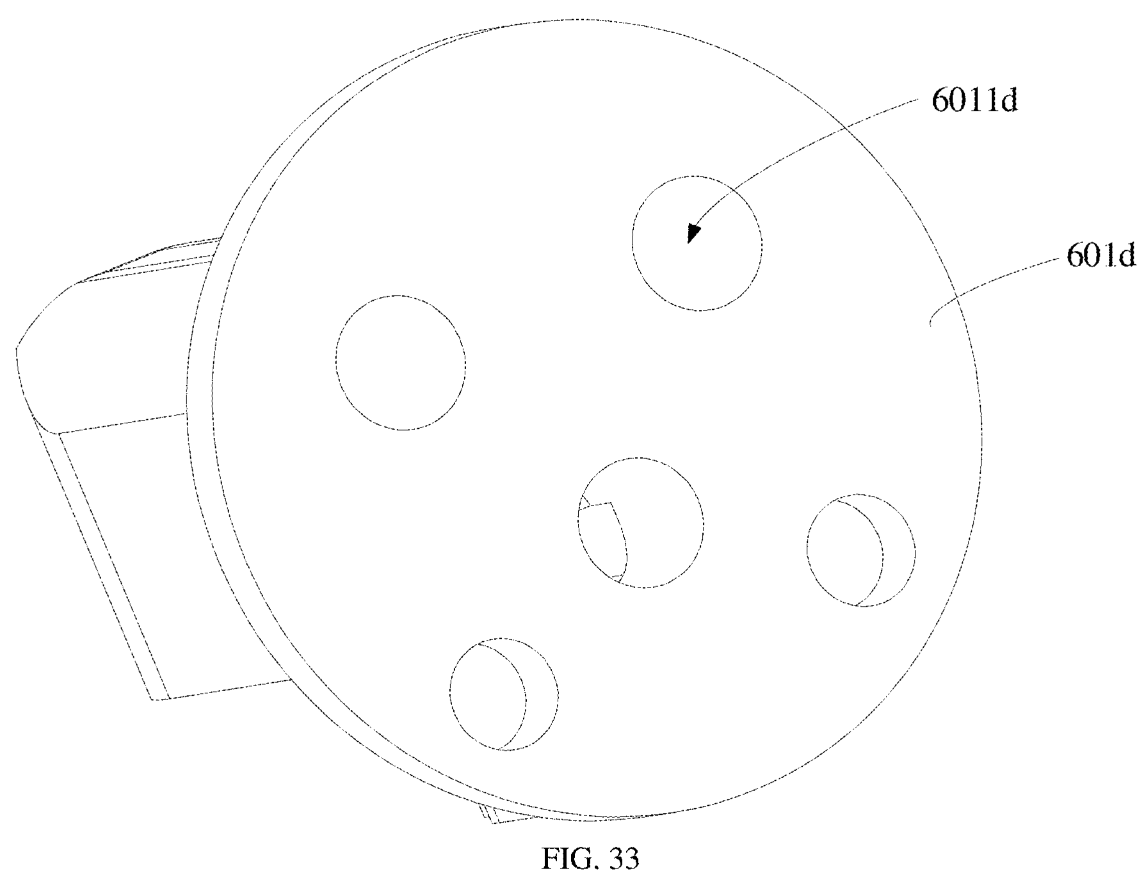
FIG. 33 is another structural diagram of the base shown in FIG. 31.

Please referring to FIGS. 31 to 33, the present disclosure provides a fluid channel structure 60*d* according to a fourth embodiment. The fluid channel structure 60*d* is applicable to pull-out tap or non pull-out tap. The fluid channel structure 60*d* of the fourth embodiment is similar to the fluid channel structure 60*a* of the first embodiment. The differences between the two at least include: the base 61*d* includes a first side 601*d* defining at least three first openings 6011*d* and the second side 602*d* defining at least three second openings 6021*d*; each first opening 6011*d* is communicated with one corresponding second opening 6021*d* to form a first inlet channel 6013*d*, a second inlet channel 6014*d*, and an outlet channel 6015*d*; each first opening 6011*d* is communicated with the corresponding through hole of the connecting member; the outlet channel 6015*d* is arranged between the first inlet channel 6013*d* and the second inlet channel 6014*d*.

The base 61*d*, the first extension pipe 500*d*, the second extension pipe 600*d*, and the third extension pipe 700*d* can be metal (including stainless steel, copper, and the like) or plastic (the plastic may be rigid plastic or soft plastic). The first extension pipe 500*d*, the second extension pipe 600*d*, and the third extension pipe 700*d* is connected with the base 61*a* in a welding mode or a threaded connection mode. In a specific embodiment, the first extension pipe 500*d*, the second extension pipe 600*d*, and the third extension pipe 700*d* all have an external thread 5001*d*, and the base 61*d* has an internal thread 6022*d*. Preferably, the body of each of the first extension pipe 500*d*, the second extension pipe 600*d* and the third extension pipe 700*d* are made of flexible materials including flexible plastic, woven materials, silica gel, or rubber.

In one embodiment, the first inlet channel 6013*d*, the second inlet channel 6014*d* and the outlet channel 6015*d* are integratedly formed by injection molding. In another embodiment, the first inlet channel 6013*d*, the second inlet channel 6014*d* and the outlet channel 6015*d* are independent structures.

The first opening 6011*d* corresponding to the outlet channel 6015*d* is protruded from the other first opening 6011*d*. In one embodiment, the first opening 6011*d* corresponding to the outlet channel 6015*d* and the outlet channel 6015*d* are protruded outwards from a plane of the first side 601*d*, thus forming a hill and valley pattern between the first inlet channel 6013*d* and the second inlet channel 6014*d*.

The outlet channel 6015*d* is arranged below in a level with respect to the first inlet channel 6013*d* and the second inlet channel 6014*d*, thereby forming a depression 6016*d* between the first inlet channel 6013*d* and the third inlet channel 6014*d*.

In one embodiment, the first opening 6011*d* corresponding to the outlet channel 6015*d* and other first openings 6011*d* are configured to face towards a same direction. In another embodiment, the first opening 6011*d* corresponding to the outlet channel 6015*d* and other first openings 6011*d* are configured to face towards different directions.

Figure 34:
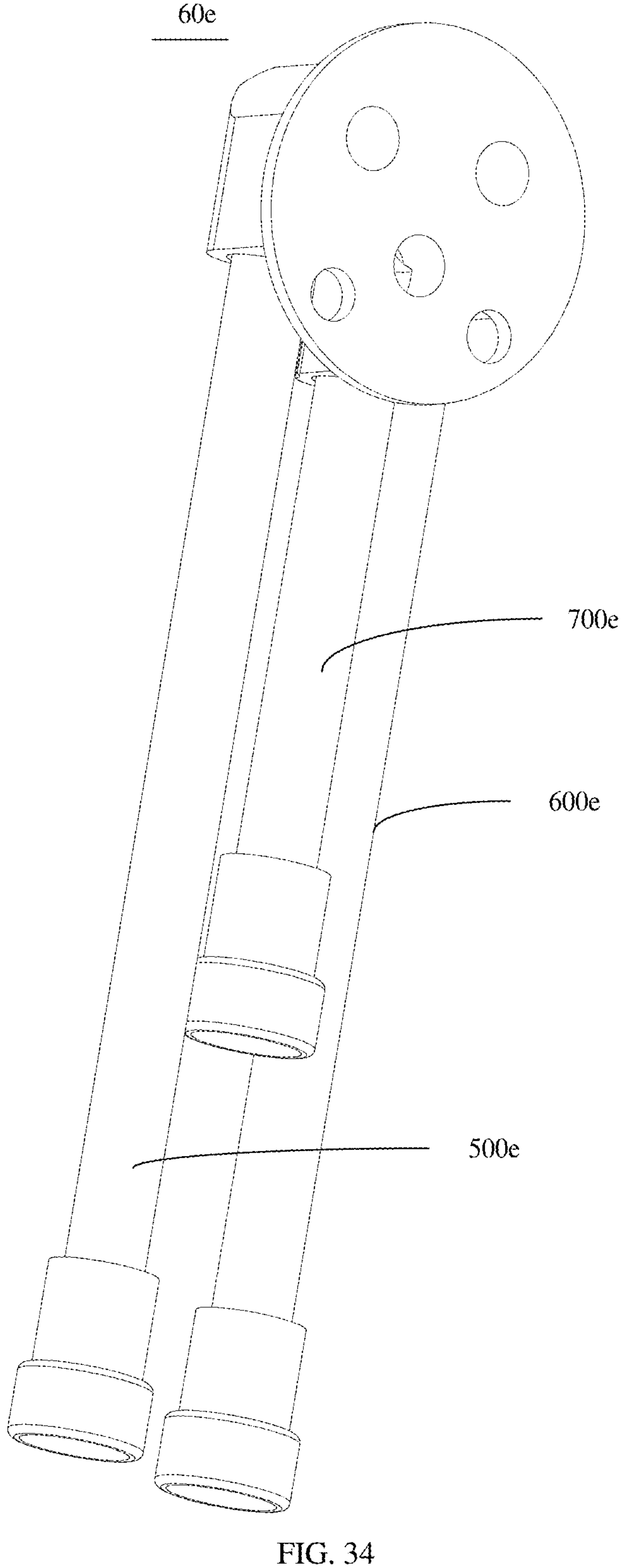
FIG. 34 is a structural diagram of a part of a fluid channel structure according to a fifth embodiment of the present disclosure.

Please referring to FIG. 34, the present disclosure provides a fluid channel structure 60*e* according to a fifth embodiment. The fluid channel structure 60*e* is applicable to a pull-out tap or a non pull-out tap. The fluid channel structure 60*e* of the fifth embodiment is similar to the fluid channel structure 60*d* of the fourth embodiment in structure. The difference between the two at least includes: the length of the third extension pipe 700*e* is less than that of the first extension pipe 500*e* or the second extension pipe 600*e*.

The length of the third extension pipe 700*e* may be about 10-30 cm, for example, the length of the third extension pipe 700*e* is 10 mm, 15 mm, 20 mm, 25 mm, or 30 mm. The length of the first extension pipe 500*e* or the second extension pipe 600*e* may be about 15-40 cm, for example, the length of the first extension pipe 500*e* or the second extension pipe 600*e* is 10 mm, 15 mm, 20 mm, 25 mm, 30 mm, 35 mm, or 40 mm.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching.

What is claimed is:

1. A fluid channel structure, applied to a tap comprising a protective housing, wherein the protective housing comprises a housing and a connecting column connected to the housing; the connecting column defines a first receiving cavity, the housing defines a second receiving cavity, and a positioning part is arranged at an end of the connecting column and is located inside the second receiving cavity; the positioning part defines a via hole, the first receiving cavity and the second receiving cavity are communicated with each other via the via hole, the first receiving cavity is extending along a first direction, the second receiving cavity is extending along a second direction intersected with the first direction; wherein the fluid channel structure comprises:

a base, received in the first receiving cavity and mounted on the positioning part; wherein, the base has two surfaces opposite to each other; the base defines at least three through holes for water flow; each of the at least three through holes penetrates the base in a thickness direction of the base to form an opening on each of the two surfaces of the base;

a first extension pipe, a second extension pipe, and a third extension pipe, wherein, the first extension pipe, the second extension pipe, and the third extension pipe are extending in the second receiving cavity; each of an end of the first extension pipe, an end of the second extension pipe, and an end of the third extension pipe is respectively directly welded to the opening of a respective one of the at least three through holes formed on one of the two surfaces.

2. The fluid channel structure according to claim 1, wherein one of the base and the positioning part defines at least one notch, the base passes through the via hole and enters into the first receiving cavity by the notch.

3. The fluid channel structure according to claim 2, wherein a maximum depth of the notch is about 1-3 mm; or the notch has an arc structure with a radius of about 3-7 mm; or a vertical distance between a first end wall and a second end wall of the notch is about 6-10 mm.

4. The fluid channel structure according to claim 1, wherein the first extension pipe, the second extension pipe and the third extension pipe approximately extend along an axial direction of the protective housing, another end of each of the first extension pipe, the second extension pipe and the third extension pipe comprises a threaded portion; wherein at least a portion of the first extension pipe, at least a portion of the second extension pipe; and at least a portion of the third extension pipe are arranged inside the second receiving cavity.

5. The fluid channel structure according to claim 4, wherein a thickness of the base is about 1-3 mm; or a diameter of the first extension pipe is about 0.6-2 cm; or a length of the first extension pipe is about 10~30 cm; or a diameter of the second extension pipe is about 0.6-2 cm; or a length of the second extension pipe is about 10~30 cm; or a diameter of the third extension pipe is about 0.6-2 cm; or a length of the third extension pipe is about 15-40 cm; or a length of the third extension pipe is greater than that of the first extension pipe or the second extension pipe; or a length of the third extension pipe is smaller than that of the first extension pipe or the second extension pipe.

6. The fluid channel structure according to claim 4, wherein the third extension pipe and the first extension pipe face towards the same direction or different direction; or the third extension pipe and the second extension pipe face towards the same direction or different direction; or the first extension pipe, the second extension pipe, the third extension pipe and the base are made of metal or rigid plastic, or a main body of each of the first extension pipe, the second extension pipe and the third extension pipe is made of flexible material.

7. The fluid channel structure according to claim 4, wherein the base has a plate structure, and the first extension pipe, the second extension pipe and the third extension pipe are communicated with the first through holes, respectively.

8. The fluid channel structure according to claim 7, further comprising:

a connecting member, defining at least three second through holes; and a sealing member, arranged between the base and the connecting member, wherein, a quantity of the sealing member is at least three, each sealing member defines a third through hole, and each third through hole is communicated with one corresponding first through hole and one corresponding second through hole; or the sealing member defines at least three fourth through holes, each of the fourth through holes is communicated with one corresponding first through hole and one corresponding second through hole.

9. The fluid channel structure according to claim 4, wherein the base defining at least three first openings and at least three second openings, the first openings are respectively communicated with the second openings to form a first inlet channel, a second inlet channel and an outlet channel, the first extension pipe, the second extension pipe and the third extension pipe are communicated with the first openings, respectively.

10. The fluid channel structure according to claim 9, further comprising:

a connecting member, defining at least three fifth through holes; and a sealing member, arranged between the base and the connecting member, wherein, a quantity of the sealing member is at least three, each sealing member defines a sixth through hole, and each sixth through hole is communicated with one corresponding first through hole and one corresponding second through hole; or the sealing member defines at least three seventh through holes, each of the seventh through holes is communicated with one corresponding first through hole and one corresponding second through hole.

11. The fluid channel structure according to claim 1, wherein the first extension pipe, the second extension pipe and the third extension pipe approximately extend along an axial direction of the protective housing, wherein at least a portion of the first extension pipe, at least a portion of the second extension pipe; and at least a portion of the third extension pipe are arranged inside the second receiving cavity.

12. A tap, comprising:

a valve core assembly, comprising the fluid channel structure as recited in claim 1; and a valve structure, connected with the fluid channel structure and configured to open and close the fluid channel structure;

wherein one of the base and the positioning part defines at least one notch, the base passes through the via hole and enters into the first receiving cavity by the notch; the base is arranged with a step portion, and the step portion is supported by the positioning part and is received in the first receiving cavity defined inside the positioning part.

13. The tap according to claim 12, wherein a maximum depth of the notch is about 1-3 mm; or the notch has an arc structure with a radius of about 3-7 mm; or a vertical distance between a first end wall and a second end wall of the notch is about 6-10 mm.

14. The tap according to claim 12, wherein the fluid channel structure further comprises:

a first extension pipe;

a second extension pipe; and a third extension pipe, wherein the first extension pipe, the second extension pipe and the third extension pipe approximately extend along an axial direction of the protective housing, one end of each of the first extension pipe, the second extension pipe and the third extension pipe is connected with the base, another end of each of the first extension pipe, the second extension pipe and the third extension pipe comprises a threaded portion; wherein at least a portion of the first extension pipe, at least a portion of the second extension pipe; and at least a portion of the third extension pipe are arranged inside the second receiving cavity.

15. The tap according to claim 12, wherein, a thickness of the base is about 1-3 mm; or a diameter of the first extension pipe is about 0.6-2 cm; or a length of the first extension pipe is about 10~30 cm; or a diameter of the second extension pipe is about 0.6-2 cm; or a length of the second extension pipe is about 10~30 cm; or a diameter of the third extension pipe is about 0.6-2 cm; or a length of the third extension pipe is about 15-40 cm; or a length of the third extension pipe is greater than that of the first extension pipe or the second extension pipe; or a length of the third extension pipe is smaller than that of the first extension pipe or the second extension pipe.

16. The tap according to claim 12, wherein the third extension pipe and the first extension pipe face towards the same direction or different direction; or the third extension pipe and the second extension pipe face towards the same direction or different direction; or the first extension pipe, the second extension pipe, the third extension pipe and the base are made of metal or rigid plastic, or a main body of each of the first extension pipe, the second extension pipe and the third extension pipe is made of flexible material.

17. The tap according to claim 16, further comprising:

a connecting member, defining at least three second through holes; and a sealing member, arranged between the base and the connecting member, wherein, a quantity of the sealing member is at least three, each sealing member defines a third through hole, and each third through hole is communicated with one corresponding first through hole and one corresponding second through hole; or the sealing member defines at least three fourth through holes, each of the fourth through holes is communicated with one corresponding first through hole and one corresponding second through hole.

18. The tap according to claim 12, wherein the base defining at least three first openings and at least three second openings, the first openings are respectively communicated with the second openings to form a first inlet channel, a second inlet channel, and an outlet channel, the first extension pipe, the second extension pipe, and the third extension pipe are communicated with the first openings, respectively.

19. The tap according to claim 18, further comprising:

a connecting member, defining at least three fifth through holes; and a sealing member, arranged between the base and the connecting member, wherein, a quantity of the sealing member is at least three, each sealing member defines a sixth through hole, and each sixth through hole is communicated with one corresponding first through hole and one corresponding second through hole; or the sealing member defines at least three seventh through holes, each of the seventh through holes is communicated with one corresponding first through hole and one corresponding second through hole.

20. A tap, comprising a protective housing, a valve structure and a fluid channel structure, the protective housing comprises a housing and a connecting column connected to the housing; the connecting column defines a receiving cavity and is arranged with a positioning part at an end of the connecting column, the positioning part defines a via hole communicated with the receiving cavity, wherein the positioning part mounts the fluid channel structure and the valve structure in the receiving cavity, wherein the fluid channel structure comprises:

a base, having two surfaces that are opposite to each other and defining at least three first openings in one of the two surfaces and at least three second openings in the other one of the two surfaces, wherein, each of the at least three first openings is communicated to one corresponding second opening to form a first inlet channel, a second inlet channel and an outlet channel; each of the first inlet channel, the second inlet, and the outlet channel penetrates the base in a thickness direction of the base; and a connecting member, defining at least three through holes, the at least three through holes are in one-to-one correspondence with the at least three first openings and communicated to corresponding second openings;

a first extension pipe, a second extension pipe, and a third extension pipe, wherein, the first extension pipe, the second extension pipe, and the third extension pipe are extending inside the housing; an end of the first extension pipe, an end of the second extension pipe, and an end of the third extension pipe are respectively directly welded to the at least three second openings.

* * * * *